(12) United States Patent
Yamanaka et al.

(10) Patent No.: US 11,188,488 B2
(45) Date of Patent: Nov. 30, 2021

(54) SEMICONDUCTOR DEVICE AND BUS GENERATOR

(71) Applicant: RENESAS ELECTRONICS CORPORATION, Tokyo (JP)

(72) Inventors: Sho Yamanaka, Tokyo (JP); Toshiyuki Hiraki, Tokyo (JP); Nobuhiko Honda, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 284 days.

(21) Appl. No.: 16/189,355

(22) Filed: Nov. 13, 2018

(65) Prior Publication Data

US 2019/0196997 A1     Jun. 27, 2019

(30) Foreign Application Priority Data

Dec. 22, 2017  (JP) .............................. JP2017-246433

(51) Int. Cl.
| | | |
|---|---|---|
| *G06F 13/00* | (2006.01) | |
| *G06F 13/362* | (2006.01) | |
| *G06F 13/40* | (2006.01) | |
| *G06F 13/16* | (2006.01) | |
| *G06F 12/0831* | (2016.01) | |
| *G06F 12/084* | (2016.01) | |

(52) U.S. Cl.
CPC .......... *G06F 13/362* (2013.01); *G06F 12/084* (2013.01); *G06F 12/0835* (2013.01); *G06F 13/1605* (2013.01); *G06F 13/1663* (2013.01); *G06F 13/1673* (2013.01); *G06F 13/4068* (2013.01)

(58) Field of Classification Search
CPC .. G06F 13/262; G06F 12/0835; G06F 12/084; G06F 13/1605; G06F 13/1663; G06F 13/1673; G06F 13/4068
See application file for complete search history.

(56) References Cited

U.S. PATENT DOCUMENTS

| | | |
|---|---|---|
| 6,189,075 B1 | 2/2001 | Sanches |
| 2004/0107265 A1 | 6/2004 | Yasunaga |

(Continued)

FOREIGN PATENT DOCUMENTS

| | | |
|---|---|---|
| GB | 2341765 A | 3/2000 |
| WO | 2017/056132 A1 | 4/2017 |

OTHER PUBLICATIONS

Partial European Search Report issued in corresponding European Patent Application No. 18214763.7-1224, dated May 8, 2019.

*Primary Examiner* — Tuan V Thai
(74) *Attorney, Agent, or Firm* — McDermott Will & Emery LLP

(57) ABSTRACT

Each master issues an access request including a read request and a write request to a memory. A cache caches the write request issued by the master. A central bus control system performs access control for the read request issued by each master and the write request output by the cache. A central bus control system performs access control for the write request issued by each master. The central bus control system performs access control in accordance with a free situation of a buffer of a memory controller. The central bus control system performs access control in accordance with a free situation of the cache.

17 Claims, 17 Drawing Sheets

(56) References Cited

U.S. PATENT DOCUMENTS

2005/0240697 A1* 10/2005 Liao .................... G06F 13/4204
710/110
2011/0173393 A1    7/2011 Isono
2011/0276735 A1* 11/2011 Cho .................... G06F 13/4022
710/110
2017/0270063 A1    9/2017 Yamanaka et al.

* cited by examiner

FIG. 8A

| SUB-SLOT 1 | SUB-SLOT 2 | SUB-SLOT 3 | SUB-SLOT 4 | SUB-SLOT 5 | SUB-SLOT 6 |
|---|---|---|---|---|---|
| READ | READ | READ | READ | READ | WRITE |

FIG. 8B

| SUB-SLOT 1 | SUB-SLOT 2 | SUB-SLOT 3 | SUB-SLOT 4 | SUB-SLOT 5 | SUB-SLOT 6 |
|---|---|---|---|---|---|
| READ | WRITE | READ | WRITE | READ | WRITE |

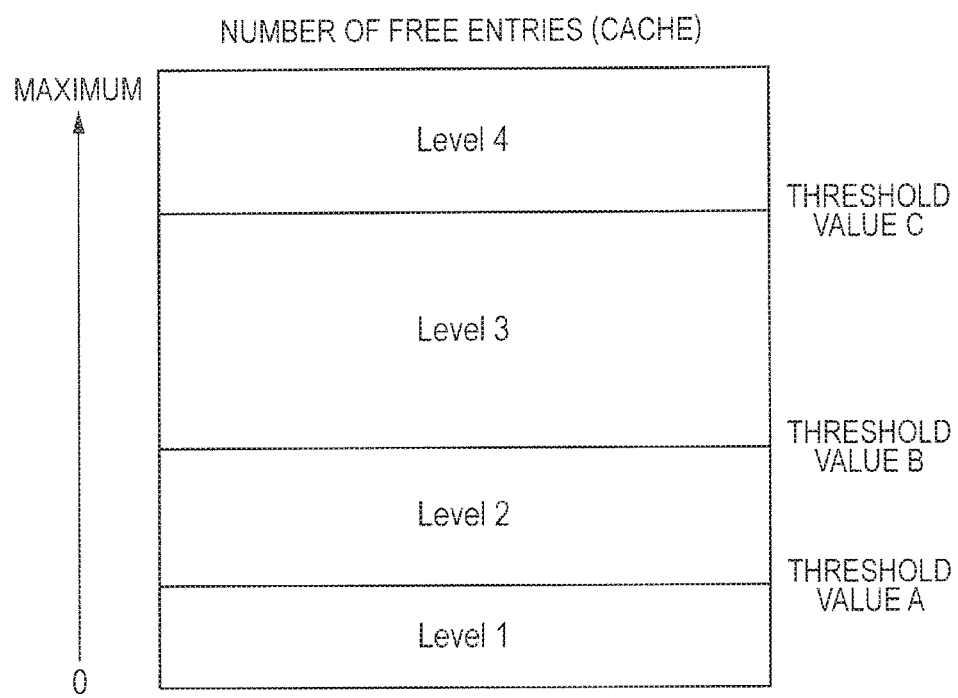

SEMICONDUCTOR DEVICE AND BUS GENERATOR

CROSS-REFERENCE TO RELATED APPLICATIONS

The disclosure of Japanese Patent Application No. 2017-246433 filed on Dec. 22, 2017 including the specification, drawings and abstract is incorporated herein by reference in its entirety.

BACKGROUND

The present invention relates to a semiconductor device, and relates to a semiconductor device which accesses, for example, a memory.

The present invention relates to a bus generator which generates a bus in the above-described semiconductor device.

International Publication No. 2017/056132 discloses access control in a bus system for coupling a plurality of bus masters to a common bus. The semiconductor device disclosed in International Publication No. 2017/056132 has a plurality of masters, a memory controller, a bus for coupling the masters and the memory controller, and a central bus control system. International Publication No. 2017/056132 discloses the central bus control system which monitors a transfer amount of each master, and selects a target master to which an access right is granted, based on a width of the reserved hand of each master, the monitored transfer amount, and the possible number of rights to be granted. In International Publication No. 2017/056132, a request of a master without the granted access right is masked by a bus between the memory controller and the master.

In International Publication No. 2017/056132, the central bus control system monitors a buffer inside the memory controller, and controls the access right granted for an access request of each master in accordance with the free situations of the buffer. The central bus control system decreases the possible number of rights to be granted every time the access right is granted, and increases the number of possible rights to be granted every time the buffer is released. The access right is granted in accordance with the free situations of the buffer, thereby enabling to prevent that the buffer is full of unprocessed access requests, and also to prevent a situation where an access request for low latency is not accepted by the memory controller.

SUMMARY

However, in International Publication No. 2017/056132, if a cache is arranged between each master and the memory controller, the buffer of the memory controller may be occupied by writing back of the cache. In this case, the access request accepted by the memory controller cannot be controlled from the central bus control system. As a result, it is difficult to guarantee the latency.

Any other objects and new features will be apparent from the descriptions of the present specification and the accompanying drawings.

According to an embodiment, there is provided a semiconductor device including a master, a memory controller, a cache, a first access control unit which controls output for a read request issued by the master to the memory controller and output for a cached write request to the memory controller, and a second access control unit which controls output for a write request issued by the master to the memory controller. The first access control unit performs access control in accordance with a free situation of the cache of the memory controller, while the second access control unit performs access control in accordance with a free situation of the cache.

According to the one embodiment, it is possible to control the access request accepted by the memory controller, even if the cache is arranged between the master and the memory controller.

BRIEF DESCRIPTION OF THE DRAWINGS

FIG. 8A and FIG. 8B are diagrams each illustrating another example of setting the read period sub-slots and write period sub-slots.

FIG. 10 is a diagram illustrating levels of the numbers of free entries in a cache.

FIG. 11 is a diagram illustrating the relationship between the levels of the numbers of free entries and target masters to which an access right is granted.

DETAILED DESCRIPTION

Figure 1:
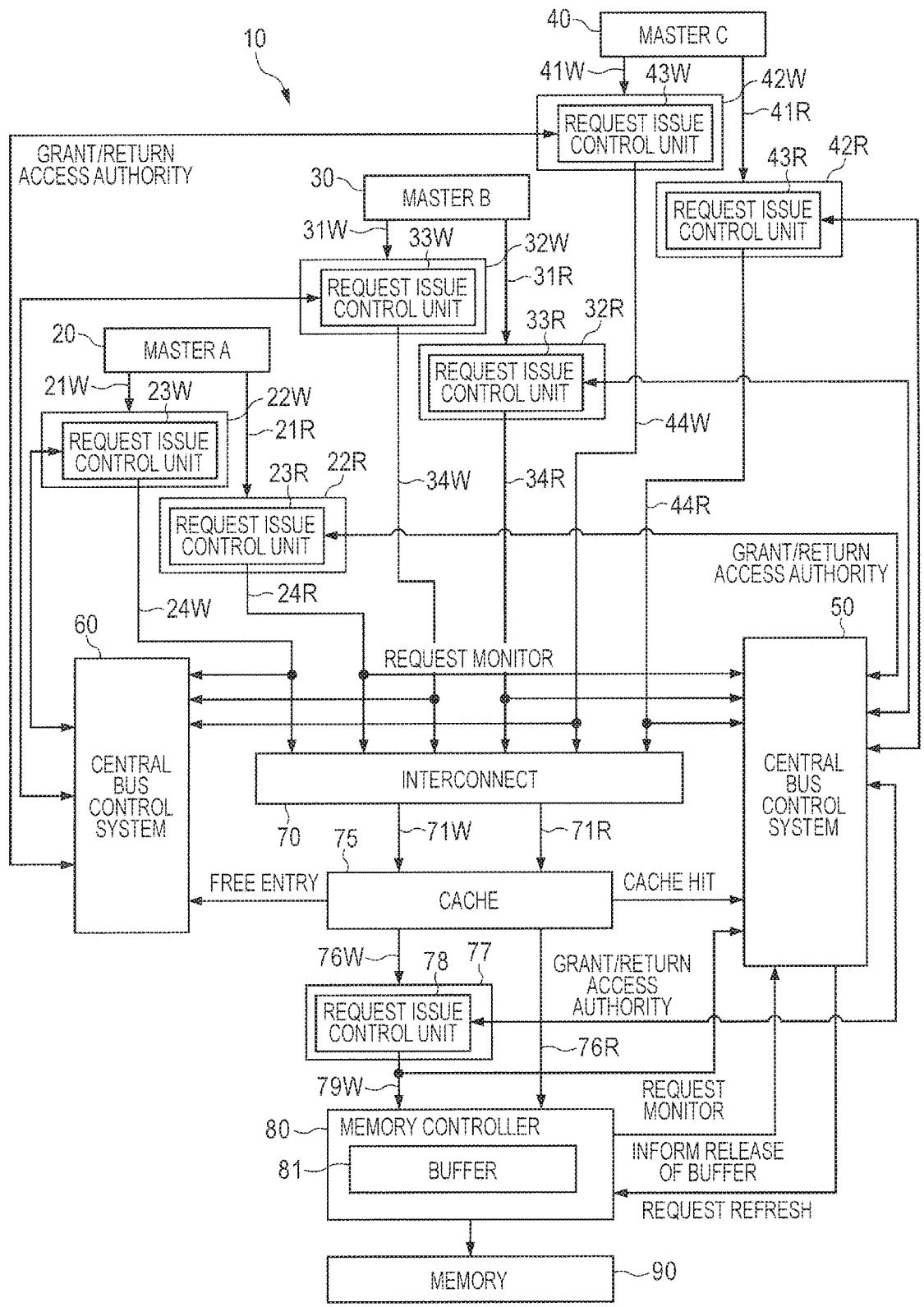
FIG. 1 is a block diagram illustrating an electronic device including a semiconductor device according to a first embodiment.

Preferred embodiments applying means for solving the above problem will hereinafter be described with reference to the accompanying drawings. For clarification of the descriptions, the following descriptions and the accompanying drawings are appropriately or partially omitted and simplified. Those elements illustrated in the drawings as functional blocks for performing various processes can be configured with, in a hardware manner, a CPU (Central Processing Unit), a memory, or any other circuits, and can be realized with, in a software manner, programs loaded in the memory. It is understandable by those skilled in the art that those functional blocks can be realized in many forms, for example, by only the hardware, the software, or a combination thereof, and are not limited to any of those. In the illustrations, the same constituent elements are identified by the same reference numerals, and will not described over and over.

The above programs are stored using various types of non-transitory computer readable mediums, and can be supplied to computers. The non-transitory computer readable mediums include various types of substantial recording mediums. Examples of the non-transitory computer readable mediums include a magnetic recording medium (for example, a flexible disk, a magnetic tape, a hard disk), a magneto-optical recording medium (for example, a magneto-optical disk), a CD-ROM (Read Only Memory) CD-R, a CD-R/W, and a semiconductor memory (for example, a mask ROM, a PROM (Programmable ROM), an EPROM (Erasable PROM), a flash ROM, RAM (Random Access Memory)). The programs may be supplied to computers using various types of non-transitory computer readable mediums. Examples of the non-transitory computer readable mediums include an electrical signal, an optical signal, and an electromagnetic wave. The non-transitory computer readable mediums can supply programs to computers, through a priority communication path, such as wire and an optical fiber, or a wireless communication path.

In the following preferred embodiments, if necessary for convenience sake, descriptions will be made to divided plural sections or preferred embodiments, however, unless otherwise specified, they are not mutually irrelevant, but one is in relations of modifications, application examples, details, supplementary explanations of a part or whole of the other. Further, in the following preferred embodiments, in the case of reference to the number of an element (including its quantity, numerical value, amount, range), unless otherwise specified and unless clearly limited in principle, the present invention is not limited to the specified number, and a number over or below the specified one may be used.

In the following preferred embodiments, the constituent elements (including the operation steps) are not necessarily indispensable, unless otherwise specified and unless considered that they are obviously required in principle. Similarly, in the following preferred embodiments, in the reference of the forms of the constituent elements or the positional relationships, they intend to include those approximating or similar substantially to the forms and like, unless otherwise specified and unless considered that they are obviously not required in principle. This is also true of the foregoing numerical values (including its quantity, numerical value, amount, range).

First Embodiment

FIG. 1 illustrates an electronic device including a semiconductor device according to a first embodiment. The electronic device 10 has a master A 20, a master B 30, a master C 40, sub-bus controllers 22R, 32R, 42R, 22W, 32W, 42W, and 77, central bus control systems 50 and 60, an interconnect 70, a cache 75, a memory controller 80, and a memory 90. Of constituent elements of the electronic device 10, for example, the master A 20, the master B 30, the master C 40, the sub-bus controllers 22R, 32R, 42R, 22W, 32W, 42W, 77, the central bus control systems 50 and 60, the interconnect 70, the cache 75, and the memory controller 80 are provided to form a semiconductor device. Of the constituent elements of the semiconductor device, for example, the sub-bus controllers 22R, 32R, 42R, 22W, 32W, 42W, and 77, the interconnect 70, the cache 75, and the memory controller 80 can be configured as a hardware circuit. The central bus control systems 50 and 60 can be configured as circuits including, for example, a hardware circuit.

The master A 20, the master B 30, and the master C 40 issue an access request for the memory 90. The access request for the memory 90 includes a read request and a write request. The memory 90 is a memory, such as a DDR-SDRAM (Double-Data-Rate Synchronous Dynamic Random Access Memory). The master A 20, the master B 30, and the master C 40 are configured as a processor of, for example, a CPU or a GPU (Graphic Processing Unit). The master A 20, the master B 30, and the master C 40 output a read request through buses (read request buses) 21R, 31R, and 41R, and output a write request through buses (write request buses) 21W, 31W, and 41W.

The master A 20 is coupled to the sub-bus controllers 22R and 22W corresponding to the buses 21R and 21W. The sub-bus controller (read sub-bus controller) 22R is coupled to the interconnect 70 through a bus 24R. The sub-bus controller (a write sub-bus controller 2) 22W is coupled to the interconnect 70 through a bus 24W. The sub-bus controller 22R includes a request issue control unit (a read request issue control unit) 23R. The sub-bus controller 22W includes a request issue control unit (a write request issue control unit 2) 23W. The request issue control units 23R and 23W receive a read request and a write request respectively through the buses 21R and 21W, and control the output of the received read request and write request to the buses 24R and 24W.

The master B 30 is coupled to the sub-bus controllers 32R and 32W corresponding to the buses 31R and 31W. The sub-bus controllers 32R and 32W are coupled to the interconnect 70 respectively through buses 34R and 34W. The sub-bus controllers 32R and 32W respectively include request issue control units 33R and 33W. Similarly, the master C 40 is coupled to the sub-bus controllers 42R and 42W corresponding to the buses 41R and 41W. The sub-bus controllers 42R and 42W are coupled to the interconnect 70 respectively through buses 44R and 44W. The sub-bus controllers 42R and 42W respectively include request issue control units 43R and 43W.

The request issue control units 23R and 23W receive respectively a read request and a write request from the master A 20. When access right is granted from the central bus control system 50, the request issue control unit 23R outputs the read request issued by the master A 20 to the interconnect through the bus 24R. When access right is granted from the central bus control system 60, the request issue control unit 23W outputs the write request issued by the master A 20 to the interconnect 70 through the bus 24W. When the access right is not granted, the request issue control units 23R and 23W suppress the output of the read request and write request issued by the master A 20 to the interconnect 70.

Functions of the request issue control units 33R and 43R are the same as those of the request issue control unit 23R, while functions of the request issue control units 33W and 43W are the same as those of the request issue control unit 23W. When access right is granted, and when no read request is received from a corresponding master, the request issue control units 23R, 33R, and 43R may output an access right return signal to the central bus control system 50 to return the access right. When the access right is granted, and when no write request is received from a corresponding master, the request issue control units 23W, 33W, and 43W may output an access right return signal to the central bus control system 60 to return the access right. The central bus control systems 50 and 60 may use the returned access right for granting the access right to any other request issue control unit.

The interconnect 70 is coupled to the cache 75 through buses 71R and 71W. The interconnect 70 receives a read request and a write request issued by each of the master A 20, the master B 30, and the master C 40, through the buses 24R, 34R, 44R, 24W, 34W, and 44W. The interconnect 70 is, for example, a bus arbiter, and arbitrates a read request and a write request which are input from a plurality of masters. When the read request and the write request are received from the master A 20, the master B 30, and the master C 40, the interconnect 70 outputs the read request and the write request issued by a master with high priority to the cache 75, in accordance with the priority set for each of the masters. When a response to the read request or the write request output to the cache 75 is obtained, the interconnect 70 selects a read request or a write request of a master with second highest priority, and outputs it to the cache 75.

The cache 75 is arranged between the memory controller 80 and the interconnect 70. Input to the cache 75 are the read request and the write request output from the interconnect 70 through the buses 71R and 71W. The cache 75 performs write-back in response to the write request, and caches the input write request and write data. The cache 75 caches read data which is read in accordance with the read request. The cache 75 has a plurality of entries for temporarily storing the write data and the read data.

After the cache 75 caches, for example, the write request, and outputs the cached write request to the memory controller 80 through a bus 79 and the sub-bus controller (a write sub-bus controller 1) 77. When there is a free space, for example, in a buffer 81, the memory controller 80 receives the write request from the cache 75. The sub-bus controller 77 includes a request issue control unit (a write request issue control unit 1) 78. The request issue control unit 78 receives a write request from the cache 75 through a bus 76W. The request issue control unit 78 controls the output of the received write request to a bus 79W. When an access right is granted from the central bus control system 50, the request issue control unit 78 outputs the write request to the bus 79W. When no access right is granted, the request issue control unit 78 suppresses the output of the write request to the bus 79W. When an access right is granted, and when no write request is received, the request issue control unit 78 may output an access right return signal to the central bus control system 50 to return the access right. The central bus control system 50 may use the returned access right for granting the access right to any other request issue control unit.

When the read request is input, the cache 75 judges whether data (read data) requested by the read request is cached. In other words, the cache 75 judges whether a cache hit has been made. When the read data is not cached, the cache 75 outputs a read request to the memory controller 80 through a bus 76R. When the read data is cached, the cache 75 outputs the read data to a master as an issuing source of the read request, as a response to the read request. If the read data is output to the master, the cache 75 may output information representing that the cache hit has been made to the central bus control system 50, to return the access right granted to the request issue control unit 23R, 33R, or 43R to the central bus control system 50.

The memory controller 80 is coupled to the master A 20, the master B 30, and the master C 40, through the bus, the cache 75, and the interconnect 70. Then, it accesses the memory 90 in response to an access request received through the cache 75. FIG. 1 illustrates an example in which the electronic device 10 has three masters.

However, the number of masters is not particularly limited. The electronic device 10 may have at least one master which issues an access request for accessing the memory 90 to the memory controller 80. When the number of masters is one, there is no need to provide the interconnect 70 for arbitration.

The memory controller 80 has the buffer (a request buffer) 81. The buffer 81 stores an access request received by the memory controller 80 through the interconnect 70 and the cache 75. The buffer 81 has a plurality of entries, and is configured to store a plurality of access requests. The memory controller 80 has, for example, a scheduler and a memory command generation unit, other than the buffer 81. The scheduler selects one of the access requests stored in the buffer 81. The memory command generation unit generates a memory command (a command signal) for accessing the memory 90 in response to the selected access request. When the access request is selected from the buffer 81 and processed, the memory controller 80 outputs buffer release notification representing that the entry of the buffer 81 is released to the central bus control system 50.

The central bus control system (central bus control system 1) 50 performs access control for the read request and the write request, using the sub-bus controllers 22R, 32R, 42R, and the sub-bus controller 77. The central bus control system 50 is provided to form an access control unit (access control unit 1) with the sub-bus controllers 22R, 32R, and 42R, in addition to the sub-bus controller 77. The central bus control system 50 performs access control for the read request and the write request, in accordance with the free situations of the buffer 81.

The central bus control system 50 controls granting of the access right, for example, to the request issue control units 23R, 33R, and 43R, thereby performing access control for the read request output from each master to the memory controller 80. The central bus control system 50 controls granting of the access right to the request issue control unit 78, thereby performing access control for the write request output from the cache 75 to the memory controller 80.

The central bus control system (central bus control system 2) 60 performs access control for the write request, using the sub-bus controllers 22W, 32W, and 42W. The central bus control system 60 is provided to form another access control unit (access control unit 2) with the sub-bus controllers 22W, 32W, and 42W. The central bus control system 60 acquires the number of free entries of the cache 75 therefrom. The central bus control system 60 monitors the free situations of the cache 75 based on the acquired number of free entries, and performs access control in accordance with the free situations of the cache 75. The central bus control system 60 controls granting of the access right, for example, to the request issue control units 23W, 33W, and 43W, thereby performing access control for the write request output from each master to the cache 75.

The user sets the band of each master in, for example, the central bus control systems 50 and 60 in advance, and guarantees the QoS (Quality of Service) in a constant period of time (slot). In this embodiment, the master is assumed to exist in association with each type of the access request, and the band of each master is set in association with the read request and the write request. In the access control performed by the central bus control system 50, the cache 75 outputting the write request is assumed as one master. The central bus control system 50 grants an access right to each of the request issue control units 23R, 33R, 43R, and 78, in accordance with, for example, the contents of predetermined access control. The central bus control system 60 grants an access right to each of the request issue control units 23W, 33W, and 43W, in accordance with, for example, the contents of predetermined access control. The contents of the access control may be the same as those described in International Publication No. 2017/056132. The contents of International Publication No. 2017/056132 are incorporated in this specification, as a reference.

The central bus control system 50 determines whether to grant an access right to the request issue control units 23R, 33R, 43R, and 78 corresponding to the masters and the cache 75, based on, for example, the QoS information which is set for the read request of each master and the write request of the cache 75. At this time, the central bus control system 50 monitors a transaction running through buses using a request monitor (a transaction monitor signal) acquired from the buses 24R, 34R, 44R, and 79W. It may grant an access right thereto, while performing correction in association with each slot based on a transfer amount of the transaction. The central bus control system 50 controls the output of the read request and the write request issued by each master and the cache 75 to the memory controller 80, by granting the access rights.

The central bus control system 60 determines whether to grant an access right to the request issue control units 23W, 33W, and 43W corresponding to the masters, based on, for example, the QoS information set for the write request of each master. At this time, the central bus control system 60 monitors a transaction running through buses using a request monitor (a transaction monitor signal) acquired from the buses 24W, 34W, and 44W. It may grant access rights, while performing correction in association with each slot based on a transfer amount of the transaction. The central bus control system 60 controls the output of the read request and the write request issued by each master to the cache 75, by granting the access rights.

[Central Bus Control System 1]

Figure 2:
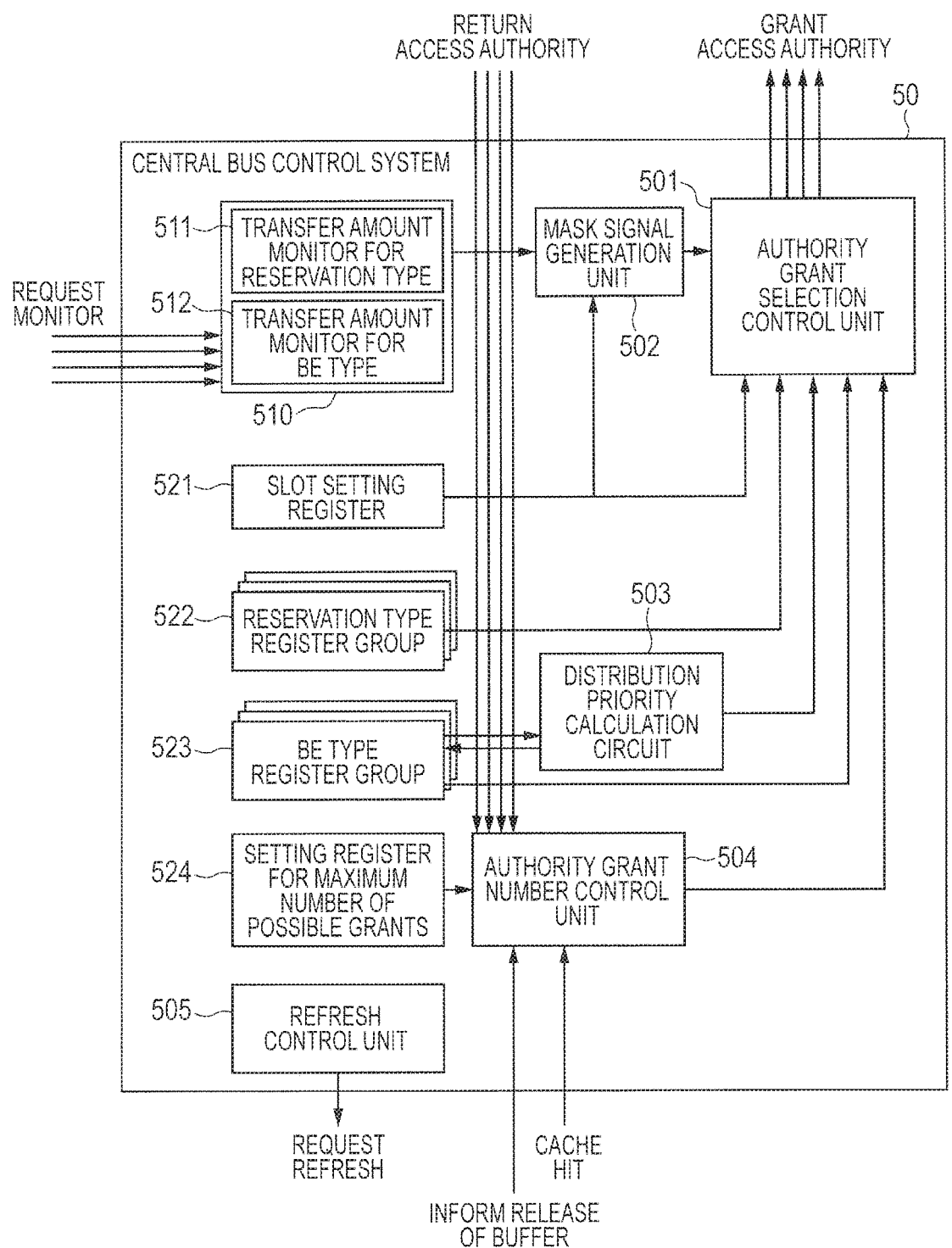
FIG. 2 is a block diagram illustrating a configuration example of a central bus control system 1.

FIG. 2 illustrates a configuration example of the central bus control system 50. The central bus control system 50 has a right grant selection control unit 501, a mask signal generation unit 502, a distribution priority calculation circuit 503, a right grant number control unit 504, a refresh control unit 505, a transfer amount monitor 510, a slot setting register 521, a reservation type register group 522, a BE (Best Effort) type register group 523, and a setting register 524 for the maximum possible number of grants.

The transfer amount monitor 510 is a function unit for measuring a transfer amount of a transaction for the read request and the write request transferred through the bus. The transfer amount monitor 510 has a reservation type transfer amount monitor 511 and a BE type transfer amount monitor 512. The reservation type transfer amount monitor 511 measures a transfer amount of a transaction for the read request transferred to the interconnect 70 through the buses 24R, 34R, and 44R (see FIG. 1). The reservation type transfer amount monitor 511 measures also a transfer amount of a transaction for the write request transferred to the memory controller 80 through the bus 79W. The BE type transfer amount monitor 512 also measures a transfer amount of a transaction for the read request transferred to the interconnect 70 through the buses 24R, 34R, and 44R. It also measures a transfer amount of a transaction for the write request transferred to the memory controller 80 through the bus 79W.

The slot setting register 521 stores the number of sub-slots included in one basic slot and the period of one sub-slot. The basic slot represents, for example, a refresh period in the memory 90. It is possible to change the number of sub-slots in one basic slot stored in the slot setting register 521 and the period of one sub-slot.

The refresh control unit 505 sends a refresh request to the memory controller 80, and controls to perform a refresh operation in the memory 90. The refresh control unit 505 sends a refresh request to the memory controller 80, in a sub-slot with a predetermined number of the basic slot which is set, for example, using a non-illustrative register.

The right grant selection control unit 501 grants an access right to the request issue control units 23R, 33R, 43R, and 78. The right grant selection control unit 501 determines (selects) whether to grant the access right to a particular request issue control unit, at the time of granting the access right. The right grant selection control unit 501 outputs an access right granting signal representing that the access right has been acquired to a target request issue control unit to which the access right is granted. The right grant selection control unit 501 asserts the access right granting signal to be output to the target request issue control unit to which the access right is granted, and negates the signal to be output to the request issue control unit to which no access right is granted.

The right grant number control unit 504 calculates the number of access rights (possible number of rights to be granted) that can be granted to the request issue control unit. The setting register 524 for the maximum possible number of rights to be granted stores the maximum possible number of access rights to be granted. The maximum possible number of access rights to be granted is set in accordance with the number of access requests that can be stored, for example, in the buffer 81 of the memory controller 80. The right grant number control unit 504 calculates the possible number of access rights to be granted, in accordance with the free situations of the buffer 81, while the maximum number stored in the setting register 524 for the maximum number of possible grants is assumed as the upper limit. The right grant selection control unit 501 grants the access right, in a range of possible number of access rights to be granted that the right grant number control unit 504 has calculated.

If, for example, the right grant selection control unit 501 grants an access right (s) to any request issue control unit, the right grant number control unit 504 decreases the possible number of access rights to be granted by the number of granted access rights. If, for example, the memory controller 80 outputs buffer release notification, the right grant selection control unit 504 increases the possible number of rights to be granted by the number of entries of the buffer. If any request issue control units returns the access right, the right grant number control unit 504 increases the possible number of rights to be granted by the number of returned access right(s). When the cache 75 outputs notification representing that a cache hit has been made, the right grant number control unit 504 increases the possible number of rights to be granted by the number of read requests corresponding to the cache hit.

The reservation type register group 522 includes, for example, a reservation bandwidth setting register and a reservation type priority level setting register. The reservation bandwidth setting register stores a reservation bandwidth which is set in association with each master and the cache 75. The reservation bandwidth setting register stores a reservation transfer amount per sub-slot, for the each master and the cache 75, as a reservation bandwidth. The reservation type priority level setting register stores a priority level of, for example, each master and the cache 75.

The mask signal generation unit 502 judges whether the transfer amount of each master and the cache 75 reaches a reservation transfer amount of each master and the cache 75. When the transfer amount of the sub-slot, for any master or the cache 75, reaches the reservation transfer amount, the mask signal generation unit 502 generates a mask signal representing the rest of period of the sub-slot, for the master and the cache 75.

The BE type register group 523 includes, for example, a target transfer amount setting register, an update transfer amount register, a distribution priority correction period setting register, and a BE type priority level setting register. The target transfer amount setting register stores a target transfer amount per sub-slot, in association with each master and the cache 75. The update transfer amount register stores an accumulative transfer amount representing an accumulative value of the transfer amount, for each master and the cache 75. The distribution priority correction period setting register stores a distribution priority correction period representing a period to correct the target transfer amount. The BE type priority level setting register stores a priority level for each master and the cache 75.

The distribution priority calculation circuit 503 calculates a distribution priority representing a priority level for the distribution of the access right. The distribution priority calculation circuit 503 calculates the distribution priority level based on the target transfer amount of, for example, each master and the cache 75. More specifically, the distribution priority calculation circuit 503 calculates the distribution priority level, using a transfer amount measured with the BE type transfer amount monitor 512, a target transfer amount, an accumulative transfer amount, and a distribution priority correction period.

The distribution priority calculation circuit 503 updates an accumulative transfer amount stored in the update transfer amount register included in the BE type register group 523, every time the sub-slot elapses. More specifically, the distribution priority calculation circuit 503 reads the accumulative transfer amount up to the sub-slot from the update transfer amount register. The distribution priority calculation circuit 503 calculates an accumulative transfer amount up to the present sub-slot, using the read accumulative transfer amount and the transfer amount of the present sub-slot measured by the BE type transfer amount monitor 512. The distribution priority calculation circuit 503 stores the calculated accumulative transfer amount in the update transfer amount register, thereby updating the accumulative transfer amount. The distribution priority calculation circuit 503 outputs the calculated distribution priority level to the right grant selection control unit 501.

The right grant selection control unit 501 independently performs selection of a target to which an access right is granted using the reservation type register group 522 and selection of target to which an access right is granted using the BE type register group 523. The right grant selection control unit 501 determines a request issue control unit to which an access right is granted using the reservation bandwidth and also the priority level read from the reservation type register group 522, in the selection of the target to which the access right is granted using the reservation type register group 522. The right grant selection control unit 501 determines a request issue control unit to which an access right is granted, using the priority level calculated by the distribution priority calculation circuit 503 and the priority level read from the BE type register group 523, in the selection of the target to which the access right is granted using the BE type register group 523.

[Central Bus Control System 2]

Figure 3:
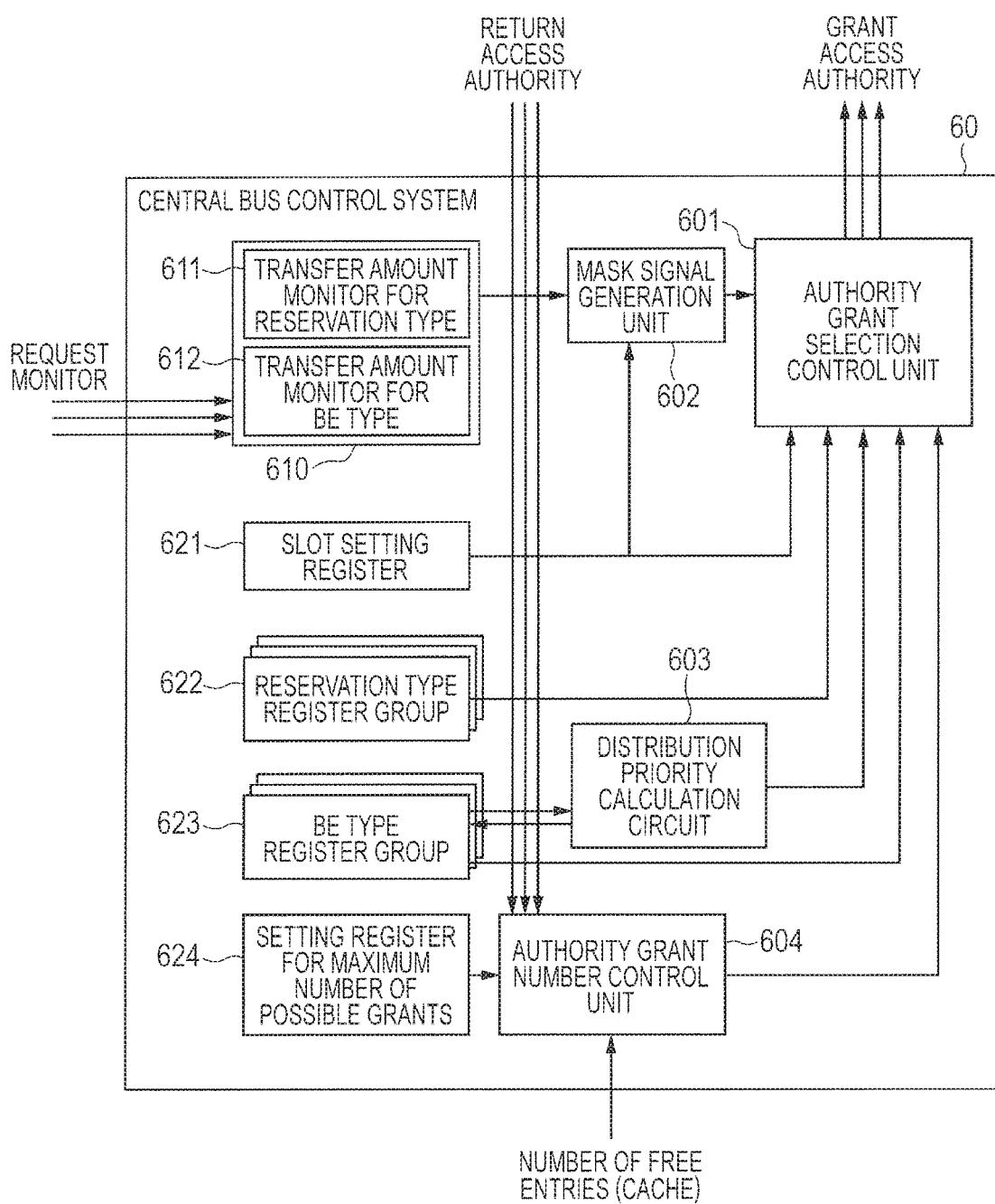
FIG. 3 is a block diagram illustrating a configuration example of a central bus control system 2.

FIG. 3 illustrates a configuration example of the central bus control system 60. The central bus control system 60 has a right grant selection control unit 601, a mask signal generation unit 602, a distribution priority calculation circuit 603, a right grant number control unit 604, a transfer monitor 610, a slot setting register 621, a reservation type register group 622, a BE type register group 623, and a setting register 624 for the maximum possible number of grants. The central bus control system 60 may have the same configuration as that of the central bus control system 50, except that the refresh control unit 505 (see FIG. 2) is not included.

The transfer amount monitor 610 is a function unit for measuring a transfer amount of a transaction for a write request transferred through buses. The transfer amount monitor 610 has a reservation type transfer amount monitor 611 and a BE type transfer amount monitor 612. The reservation type transfer amount monitor 611 measures a transfer amount of a transaction for the write request transferred to the interconnect 70 through the buses 24W, 34W, 44W (see FIG. 1). The BE type transfer amount monitor 612 also measures a transfer amount of a transaction for the write request transferred to the interconnect 70 through the buses 24W, 34W, and 44W. The slot setting register 621 stores the number of sub-slots in one basic slot and the period of one sub-slot.

The right grant selection control unit 601 grants an access right to the request issue control units 23W, 33W, and 43W. The right grant selection control unit 601 determines (selects) whether to grant an access right to a particular request issue control unit, at the time of granting the access right. The right grant selection control unit 601 outputs an access right granting signal representing that the access right has been acquired, to a target request issue control unit to which the access right is granted. The right grant selection control unit 601 asserts, for example, an access right granting signal to be output to the target request issue control unit to which the access right is granted, and negates the signal to be output to the request issue control unit to which no access right is granted.

The right grant number control unit 604 calculates the number of access rights (the possible number of rights to be granted) to be granted to the request issue control unit. The setting register 624 for the maximum possible number of grants stores the maximum number of access rights to be granted. The maximum possible number of rights to be granted is set in accordance with the number of write requests (size of write data) to be cached by the cache 75. The right grant number control unit 604 calculates the possible number of access rights to be granted, for example, in accordance with the free situations of the cache 75, while the maximum number stored in the setting register 624 for the maximum possible number of grants is assumed as the upper limit. The right grant selection control unit 601 grants the access right, in a range of possible number of rights to be granted that the right grant number control unit 604 has calculated.

If, for example, the right grant selection control unit 601 grants an access right to any request issue control unit, the right grant number control unit 604 decreases the possible number of rights to be granted by the number of access rights. When the number of free entries of the cache 75 increases, the right grant number control unit 604 increases the possible number of rights to be granted by the increased number of entries. If any request issue control unit returns the access right, the right grant number control unit 604 increases the possible number of rights to be granted by the number of returned access rights.

The reservation type register group 622 includes, for example, a reservation bandwidth setting register and a reservation type priority level setting register. The reservation bandwidth setting register stores, for example, reservation bandwidths set for the masters. The reservation bandwidth setting register stores a reservation transfer amount of a transaction for a write request per sub-block of each master, as a reservation bandwidth. The reservation type priority level setting register stores, for example, the priority level of each master. Note that the reservation bandwidth setting register of the reservation type register group 522 (see FIG. 2) in the central bus control system 50 may store, for example, the total amount of reservation transfer amounts of the masters that are stored in the reservation bandwidth setting register of the reservation type register group 622, as the reservation bandwidth for the transaction for the write request output from the cache 75.

The mask signal generation unit 602 judges whether the transfer amount of each master reaches the reservation transfer amount of each master, in each sub-slot. When the transfer amount in the sub-slot of any master reaches the reservation transfer amount, the mask signal generation unit 602 generates a mask signal representing the rest of the period in this sub-slot.

The BE type register group 623 includes, for example, a target transfer amount setting register, an update transfer amount register, a distribution priority correction period setting register, and a BE type priority level setting register. The target transfer amount setting register stores a target transfer amount per sub-slot, in association with each master. The update transfer amount register stores an accumulative transfer amount representing an accumulative value of the transfer values, in association with each master. The distribution priority correction period setting register stores the distribution priority correction period representing the period to correct the target transfer amount. The BE type priority level setting register stores the priority level in association with each master.

The distribution priority calculation circuit 603 calculates the distribution priority representing the priority with respect to distribution of the access rights. The distribution priority calculation circuit 603 calculates, for example, the distribution priority, based on the target transfer amount of each master. The calculation for the distribution priority in the distribution priority calculation circuit 603 may be performed in the same manner as that performed by the distribution priority calculation circuit 503 of the central bus control system 50. The distribution priority calculation circuit 603 outputs the calculated distribution priority to the right grant selection control circuit 601.

The right grant selection control unit 601 independently performs selection of a target to which the access right is granted using the reservation type register group 622 and selection of a target to which the access right is granted using the BE type register 623. In the selection of the target to which the access right is granted using the reservation type register group 622, the right grant selection control unit 601 determines a request issue control unit to which the access right is granted, using, for example, the reservation bandwidth and the priority level read from the reservation type register group 622. In the selection of the target to which the access right is granted using the BE type register group 623, the right grand selection control unit 601 determines a request issue control unit to which the access right is granted, using, for example, the distribution priority calculated by the distribution priority calculation circuit 603 and the priority level read from the BE type register group 623.

[Operation Procedure]

Figure 4:
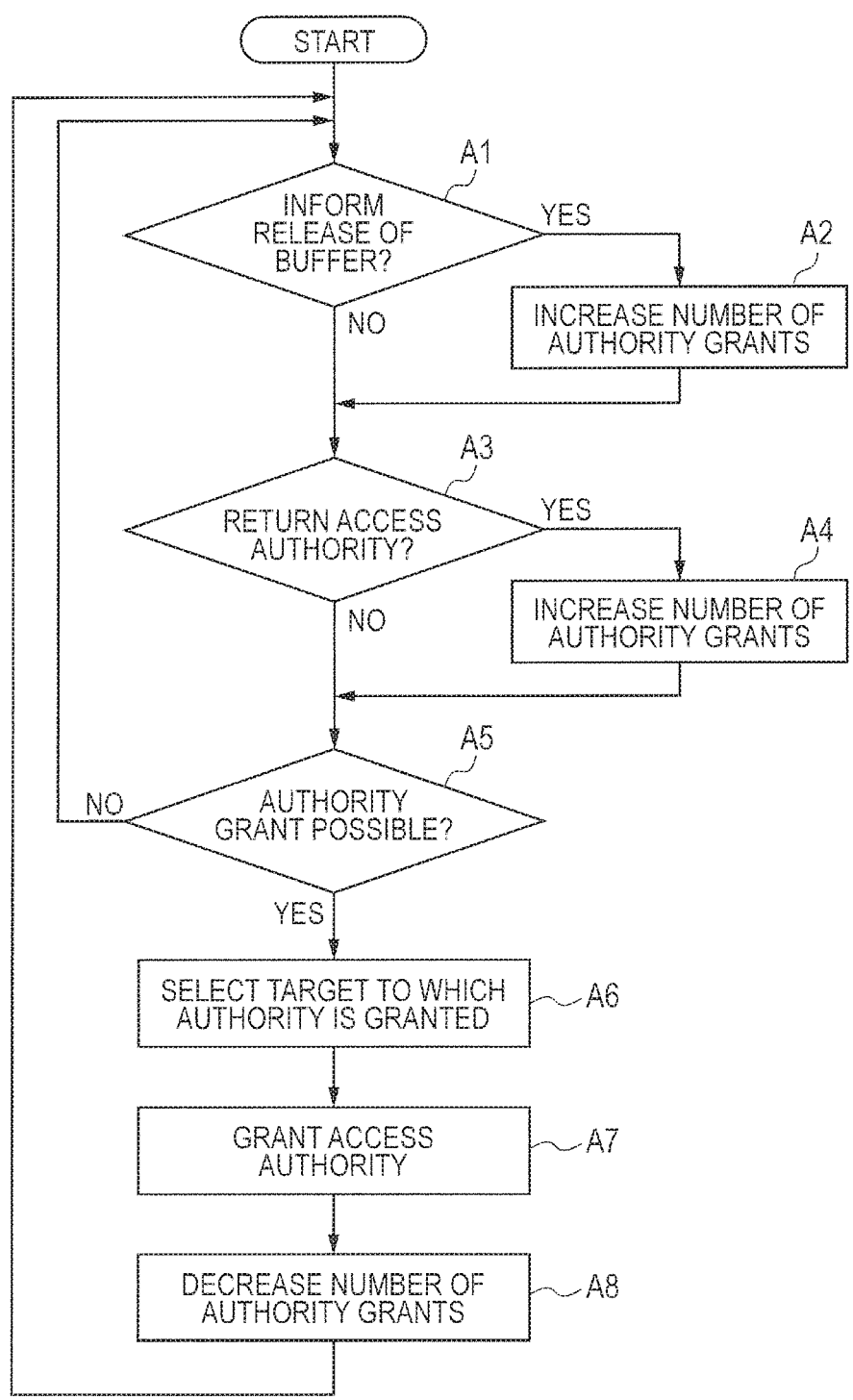
FIG. 4 is a block diagram illustrating an operation procedure for granting an access right in the central bus control system 1.

FIG. 4 illustrates an operation procedure granting an access right in the central bus control system 50. The right grant number control unit 504 (see FIG. 2) judges whether buffer release notification has received from the memory controller 80 (Step A1). When it is judged that the buffer release notification has been received in Step A1, the right grant number control unit 504 increases the possible number of rights to be granted by the number of released buffers (Step A2). When it is judged that the buffer release notification has not been received in Step A1, the right grant number control unit 504 does not change the possible number of rights to be granted.

The right grant number control unit 504 judges whether the access right has been returned (Step A3). When an access right return signal has been output from at least one of, for example, the request issue control units 23R, 33R, 43R, and 78, the right grant number control unit 504 judges that the access right has been returned. In addition, when notification representing that a cache hit has been made is output from the cache 75, the right grant number control unit 504 judges that the access right has been returned. When it is judged that the access right has been returned in Step A3, the right grant number control unit 504 increases the possible number of rights to be granted by the number of returned access rights (Step A4). When it is judged that the access right has not been returned in Step A3, the right grant number control unit 504 does not change the possible number of rights to be granted. It is possible to perform first either one of Step A1 and Step A3.

The right grant selection control unit 501 judges whether the access right can be granted (Step A5). In Step A5, the right grant selection control unit 501 acquires the possible number of rights to be granted from the right grant number control unit 504, and judges whether the access right can be granted based on the possible number of rights to be granted. The right grant selection control unit 501 judges that the access right can be granted, if the possible number of rights to be granted is, for example, "1" or greater. The right grant selection control unit 501 judges that the access right cannot be granted, if the possible number of rights to be granted is "0". The right grant selection control unit 501 judges whether the access right can be granted, for example, in every cycle. When it is judged that the access right cannot be granted, the process returns to Step A1.

The right grant selection control unit 501 selects a target request issue control unit to which the access right is granted, when it is judged that the access right can be granted in Step A5 (Step A6). The right grant selection control unit 501 determines, in Step S6, whether to grant the access right to a particular request issue control unit, of the request issue control units 23R, 33R, 43R, and 78 corresponding to the master A 20, the master B 30, the master C 40, and the cache 75. The right grant selection control unit 501 selects (determines) a target request issue control unit to which the access is granted, based on a selection process using, for example, the reservation type register group 522 or the BE type register 523.

The right grant selection control unit 501 grants an access right to the target selected in Step S6 (Step A7). The right grant selection control unit 501 outputs, in Step A7, an access right granting signal to the request issue control unit to which the access right is granted, thereby granting the access right. When a read request or a write request is received from a corresponding master or the cache 75, the request issue control unit which has received the access right granting signal outputs the read request or the write request to the side of the memory controller 80. When the access right granting signal is received, and when the read request and the write request is not received from a corresponding master or the cache 75, the request issue control unit outputs an access right return signal to the central bus control system 50.

If the right grant selection control unit 501 grants an access right to the request issue control unit, the right grant number control unit 504 decreases the possible number of rights to be granted (Step S8). After this, the process returns to Step A1. Then, calculation of the possible number of rights to be granted is performed based on the free situations of the buffer 81 and the return of the access right, and the access right is granted in a range of possible number of rights to be granted, in a repetitive manner.

Figure 5:
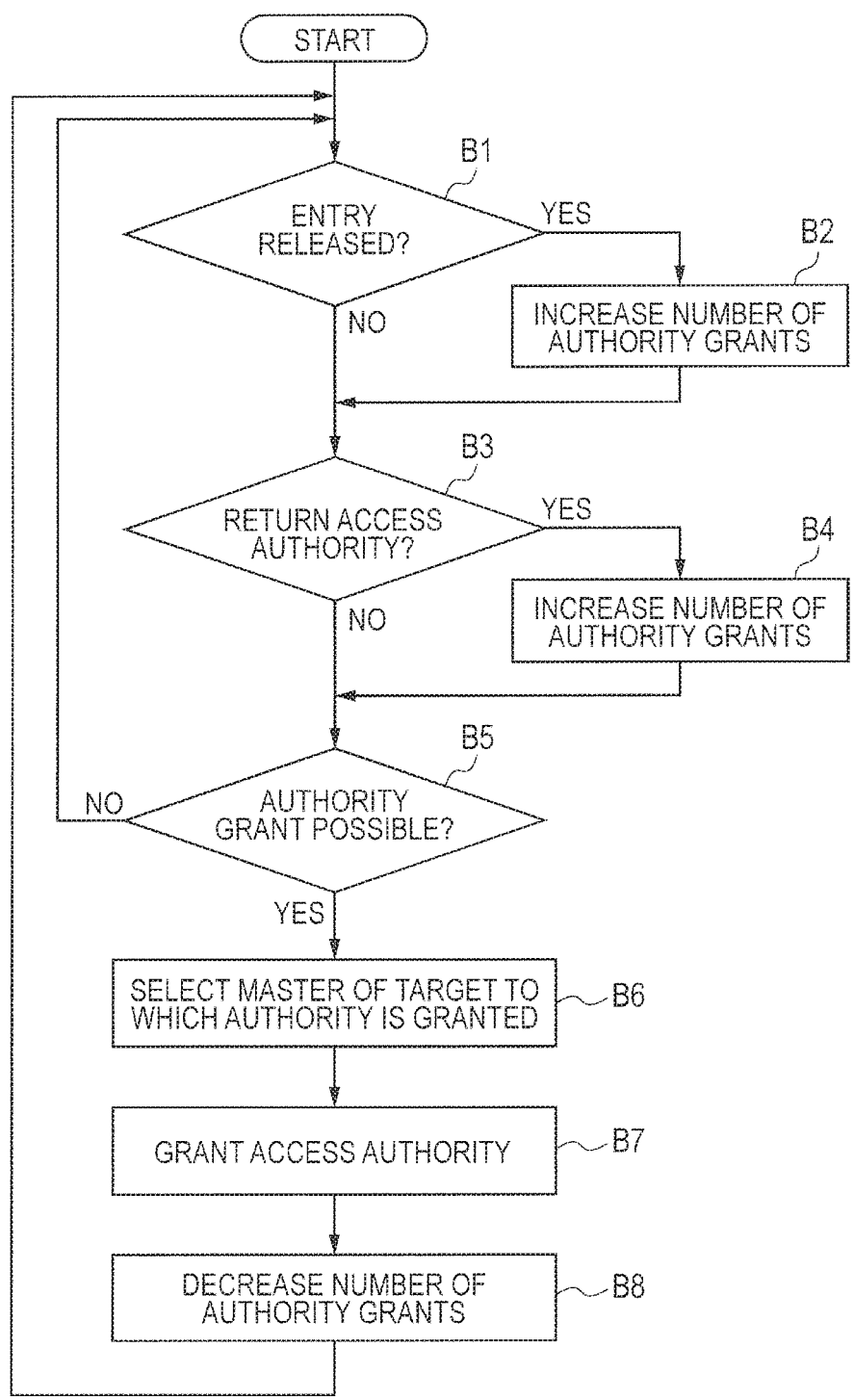
FIG. 5 is a block diagram illustrating an operation procedure for granting an access right in the central bus control system 2.

FIG. 5 illustrates an operation procedure for granting the access right in the central bus control system 60. The right grant number control unit 604 (see FIG. 3) of the central bus control system 60 monitors the free situations of the cache 75, and judges whether the entry(s) of the cache 75 has been released (Step B1). When it is judged that the entry (s) of the cache 75 has been released in Step B1, the right grant number control unit 604 increases the possible number of rights to be granted by the number of released entries (Step B2). When it is judged that the entry of the cache 75 has not bee released in Step B1, the right grant number control unit 604 does not change the possible number of rights to be granted.

The right grant number control unit 604 judges whether the access right has been returned from the request issue control unit 23W, 33W, or 43W (Step B3). The right grant number control unit 604 judges that the access right has been returned, when an access right return signal is output from at least one of, for example, the request issue control units 23W, 33W, and 43W. When it is judged that the access right has been returned in Step B3, the right grant number control unit 604 increases the possible number of rights to be granted by the number of returned access rights (Step B4). When it is judged that the access right has not bee returned in Step B3, the right grant number control unit 604 does not change the possible number of rights to be granted. It is possible to perform first either one of Step B1 and Step B3.

The right grant selection control unit 601 judges whether the access right can be granted (Step B5). The right grant selection control unit 601 acquires, in Step B5, the possible number of rights to be granted, and judges whether the access right can be granted based on the possible number of rights to be granted. The right grant selection control unit 601 judges that the access right can be granted, as long as, for example, the possible number of rights to be granted is "1" or greater. The right grant selection control unit 601 judges that the access right cannot be granted, if the possible number of rights to be granted is "0". The right grant selection control unit 601 judges that the access right can be granted, for example, in every cycle. When it is judged that the access right cannot be granted, the process returns to Step B1.

When it is judged that the access right can be granted in Step B5, the right grant selection control unit 601 selects a target request issue control unit to which the access right is granted (Step B6). In Step B6, of the request issue control units 23W, 33W, and 43W corresponding to the master A 20, the master B 30, and the master C 40, the right grant selection control unit 601 determines a target request issue control unit corresponding to which one of the masters, to which the access right is granted. The right grant selection control unit 601 selects (determines) a target request issue control unit to which the right is granted, based on a selection process using, for example, reservation type register group 622 or the BE type register group 623.

The right grant selection control unit 601 grants an access right to the target selected in Step B6 (Step B7). In Step B7, the right grant selection control unit 601 outputs an access right granting signal to the target request issue control unit to which the access right is grant, thereby granting the access right. When a write request is received from a corresponding master, the request issue control unit which has received the access right granting signal outputs the write request to the side of the memory controller 80. When the access right granting signal has been received, and when no write request has not been received from a corresponding master, the request issue control unit outputs an access right return signal to the central bus control system 60.

The right grant number control unit 604 decreases the possible number of rights to be granted by 1, if the right grant selection control unit 601 grants an access right to the request issue control unit (Step B8). After this, the process returns to Step B1. Then, calculation of the possible number of rights to be granted is performed based on the free situations of the cache 75 and the return of the access right, and the access right is granted in a range of possible number of rights to be granted.

[Summary]

In this embodiment, the electronic device 10 has the cache 75 which performs write-back, between the interconnect 70 and the memory controller 80. The write request issued by each master is kept temporarily in the cache 75. Then, the cache 75 performs write-back, when there is a free space, for example, in the memory controller 80. The cache 75 has mainly a role as a data buffer, and an expectation value that the read data hits the cache is small. In this embodiment, in access control of the central bus control system 50 for a read request of each master, access control is performed on the assumption that the read request reaches the memory controller 80, while the read data does not hit the cache. In other words, the central bus control system 50 grants an access request in response to the read request of each master, on the assumption that the read request reaches the buffer 81 of the memory controller 80.

In this embodiment, those access requests for the memory 90 are divided into access requests temporarily kept in the cache 75 and access requests stored without delay in the buffer 81 of the memory controller 80. The access control is separately performed therefor. More specifically, in this embodiment, the central bus control system 50 performs access control for the read request and the write request. In this case, the read request is expected to reach the buffer 81 of the memory controller 80 without disturbance of the cache 75, and is issued by each master, and the write request is output from the cache 75. The central bus control system 60 performs access control for the write request temporarily stored in the cache 75 and issued by each master.

Like International Publication No. 2017/056132, assuming if access control is performed only between each master and the cache 75 using one central bus control system, the buffer 81 is occupied when the cache 75 performs write-back. As a result, the central bus control system may not control the free situations of the buffer 81. In this case, the access request received by the memory controller 80 cannot be controlled from the central bus control system. Then, it is difficult to guarantee the latency, particularly, for the read request issued by each master. In this embodiment, the central bus control system 50 performs access control in accordance with the free situations of the buffer 81, in response to a read request issued by each master and back-write (write request) performed by the cache 75. This enables to control the free situations of the buffer 81 from the central bus control system 50, and to guarantee the latency for the read request issued by each master.

The central bus control system 60 performs access control in accordance with the free situations of the cache 75, in response to a write request issued by each master. At the stage that the write request is received by the cache 75, the master which has issued the write request can receive a response for the write request. The central bus control system 60 grants an access right in response to the write request issued by each master, in a range that the cache 75 can receive. As a result, it is possible to guarantee the latency, even in response to the write request issued by the master.

Second Embodiment

Figure 6:
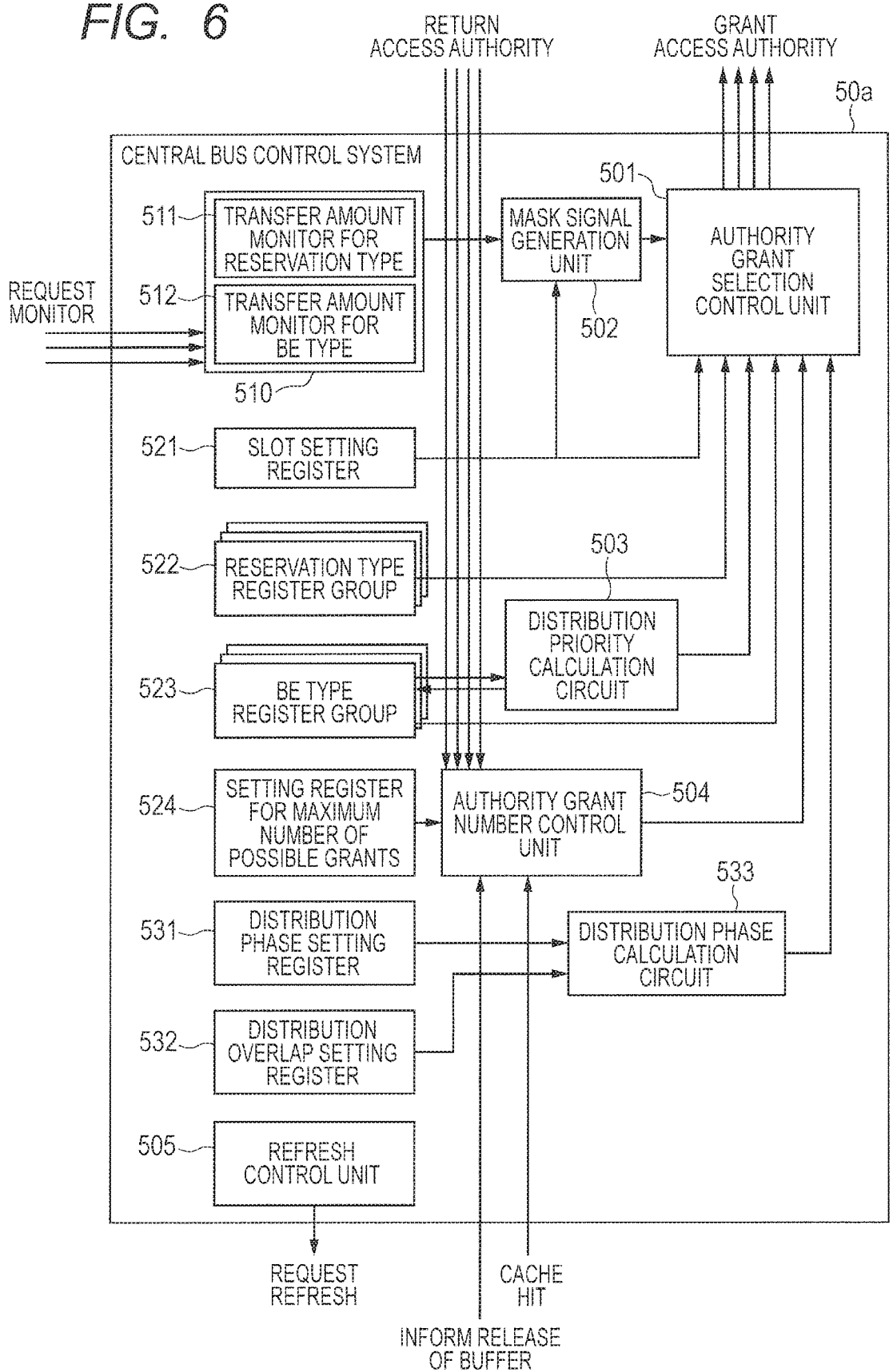
FIG. 6 is a block diagram illustrating a configuration example of the central bus control system 1 applied in a second embodiment.

Descriptions will now be made to a second embodiment. The configuration of an electronic device according to this embodiment may be the same as that of the electronic device 10 according to the embodiment illustrated in FIG. 1. FIG. 6 illustrates a configuration example of a central bus control system (central bus control system 1) for use in this embodiment. A central bus control system 50*a* for use in this embodiment has a distribution phase setting register 531, a distribution overlap setting register 532, and a distribution phase calculation circuit, in addition to the configuration of the central bus control system 50 for use in the first embodiment illustrated in FIG. 2. Any other points thereof may be the same as those of the first embodiment.

In this embodiment, the central bus control system 50*a* grants an access right exclusively in different periods, to the request issue control units 23R, 33R, and 43R corresponding to the read request of the masters and to the request issue control unit 78 corresponding to the write request of the cache 75. The central bus control system 50*a* does not grant an access right to the request issue control unit 78, in the period in which the access right is granted to the request issue control units 23R, 33R, and 43R. On the contrary, the central bus control system 50*a* does not grant an access right to the request issue control units 23R, 33R, and 43R, in the period in which the access right is granted to the request issue control unit 78.

In this embodiment, the central bus control system 50*a* has some set periods, which are a period in which the access right is granted for the read request to the request issue control units 23R, 33R, and 43R in the unit of, for example, sub-slots, and also a period in which the access right is granted for the write request to the request issue control unit 78. The distribution phase setting register 531 stores information indicating which sub-slot is a period of granting the access right for the read request or a period of granting the access right for the write request.

In this embodiment, in switching between the sub-slot (hereinafter referred to as a read period sub-slot) for granting the access right for the read request and the sub-slot (hereinafter referred to as a write period sub-slot) for granting the access right for the write request, the central bus control system 50*a* may cancel the restriction of the access right from a timing of a predetermined time before the switching timing. In the switching between the read period sub-slot and the write period sub-slot, the distribution overlap setting register 532 sets the length of the predetermined time during which restriction of the access right is canceled. For example, in the switching between the read period sub-slot and the write period sub-slot, the distribution overlap setting register 532 stores information representing whether the granting of the access right is permitted both for the read request and the write request, since a few sub-slots before completion of the present sub-slot. The distribution overlap setting register 532 may have different set timings between the switching from the read period sub-slot to the write period sub-slot and the switching from the write period sub-slot to the read period sub-slot.

A distribution phase calculation circuit 533 notifies the right selection control unit 501 of, for example, information representing that the present sub-slot is the read period sub-slot or the write period sub-slot, in accordance with the information stored in the distribution phase setting register 531. The right grant selection control unit 501 excludes the request issue control unit 78 from selection targets to which the access right is granted, in the read period sub-slot. The right grant selection control unit 501 excludes the request issue control units 23R, 33R, and 43R from selection targets to which the right access is granted, in the write period sub-slot.

The distribution phase calculation circuit 533 refers to the distribution overlap setting register 532, and notifies the right grant selection control unit 501 that the access right for the read request and the write request can be granted, at a timing of a predetermined time before the switching timing between the read period sub-slot and the write period sub-slot. When this notification is received, the right grant selection control unit 501 selects a target to which the access right is granted from the request issue control units 23R, 33R, 43R, and 78, until the end of the present sub-slot.

[Setting Example]

Figure 7:
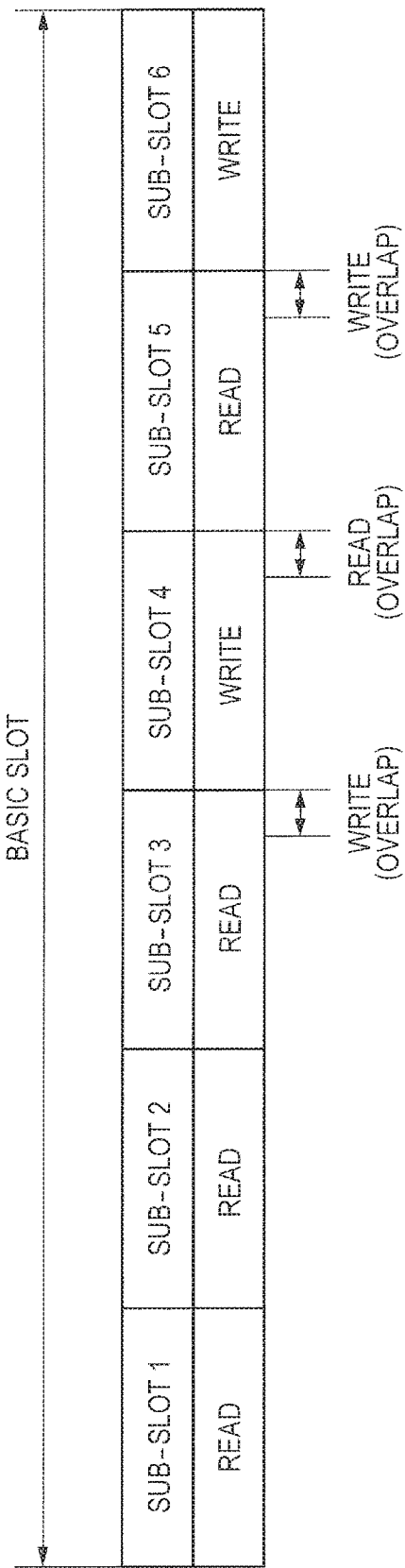
FIG. 7 is a diagram illustrating an example of setting read period sub-slots and write period sub-slots.

FIG. 7 illustrates an example of setting read period sub-slots and write period sub-slots. In the example of FIG. 7, one basic slot includes six sub-slots. The distribution phase setting register 531 stores, for example, information representing that sub-slots 1, 2, 3, and 5 are read period sub-slots, and sub-slots 4 and 6 are write period sub-slots. In this case, the right grant selection control unit 501 grants an access right for the read request in the sub-slots 1, 2, 3, and 5, and restricts the access request to be granted for the write request. The right grant selection control unit 501 grants an access right for the write request in the sub-slots 4 and 6, and restricts the access right to be granted for the read request.

In switching from the sub-slot 3 to the sub-slot 4, at a predetermined timing (overlap time) set in the distribution overlap setting register 532 before this switching timing, the distribution phase calculation circuit 533 notifies the right grant selection control unit 501 that the access right can be granted both for the read request and the write request. If this notification is received, the right grant selection control unit 501 adds the restricted write request into the targets to grant the access right, for example, in the sub-slot 3 as the read period sub-slot.

In switching from the sub-slot 4 as the write period sub-slot to the sub-slot 5 as the read period sub-slot, the right grant selection control unit 501 adds the restricted read request into the targets to grant the access right, at a predetermined time before the switching timing. In switching from the sub-slot 5 as the read period sub-slot to the sub-slot 6 as the write period sub-slot, the right grant selection control unit 501 adds the restricted write request into the targets to grant the access right, at a predetermined time before the switching timing.

In this case, the read request with the granted access right reaches the memory controller 80 through the interconnect 70 and the cache 75, while the write request reaches the memory controller right away. In this manner, the read request and the write request are different in latency since the access right is granted until reaching the memory controller 80. In each sub-slot, if distribution of the access right is performed completely in an exclusive manner, the buffer 81 of the memory controller 80 may be free, due to the difference in latency. If the access right is granted both for the read request and the write request for a predetermined time until the switching timing between the read and the write, thereby enabling to reduce the possibility that the buffer 81 becomes free.

[Summary]

In this embodiment, the central bus control system 50a grants an access right exclusively in different periods, for the read request and the write request. For the access to the memory 80, such as a DDR, when the access type is switched between the read and the write, it is necessary to provide a period in which memory access is not made for a certain time at the time of switching the access types. Thus, in the memory access, the memory access can efficiently be made, by performing the access successively for the same type. In this embodiment, in the read period sub-slot, the access right is granted for the read request. On the other hand, in the write period sub-slot, the access right is granted for the write request. As a result, the access requests of the same access type can successively reach the memory controller 80, thereby enabling to improve the scheduling efficiency in the memory controller 80.

[Modification]

In this embodiment, the central bus control system 50a may acquire the number of free entries of the cache from the cache 75, and dynamically change the number of read period sub-slots and the number of write period sub-slots in the basic slot in accordance with the number of free entries. Each of FIG. 8A and FIG. 8B illustrates an example of setting the read period sub-slots and write period sub-slots. In FIG. 8A, the sub-slots 1, 2, 3, 4, and 5 are set as read period sub-slots, while the sub-slot 6 is set as a write period sub-slot. In FIG. 8B, the sub-slots 1, 3, and 5 are set as read period sub-slots, while the sub-slots 2, 4, and 6 are set as write period sub-slots.

For example, let it be assumed that the distribution phase setting register 531 (see FIG. 6) stores the setting illustrated in FIG. 7. The distribution phase calculation circuit 533 acquires the number of free entries from the cache 75, and judges whether the number of free entries is equal to or greater than an upper threshold value or equal to or lower than a lower threshold value. When the number of free entries is lower than the upper threshold value or greater than the lower threshold value, in a normal time, the distribution phase calculation circuit 533 sets the read period sub-slots and the write period sub-slots in the same setting manner as that illustrated in FIG. 7.

When the number of free entries is equal to or greater than the upper threshold value, that is, when there are many free entries, the distribution phase calculation circuit 533 decreases the number of write period sub-slots, and sets the read period sub-slots and the write period sub-slot in the same setting as that illustrated in FIG. 8A. When the number of free entries is equal to or lower than the lower threshold value, that is, when there are only few free entries, the distribution phase calculation circuit 533 increases the number of write period sub-slots, and sets the read period sub-slots and the write period sub-slots in the same setting manner as that illustrated in FIG. 8B.

As described above, when there are many free entries, that is, when there is only few write requests for performing the write-back in the cache 75, it is possible to grant more access rights for the read request than the case of the normal time, in the basic slot. On the contrary, when there are only few free entries, that is, when there are many write requests to be written-back in the cache 75, it is possible to grant more access rights for the write request than the case in the normal time, in the basic slot. The number of read period sub-slots and the number of write period sub-slots are dynamically controlled in accordance with the number of free entries of the cache 75. As a result, when there is no need to perform the write-back, many access rights can be distributed for the read requests, thus enabling to improve the access efficiency.

Third Embodiment

Figure 9:
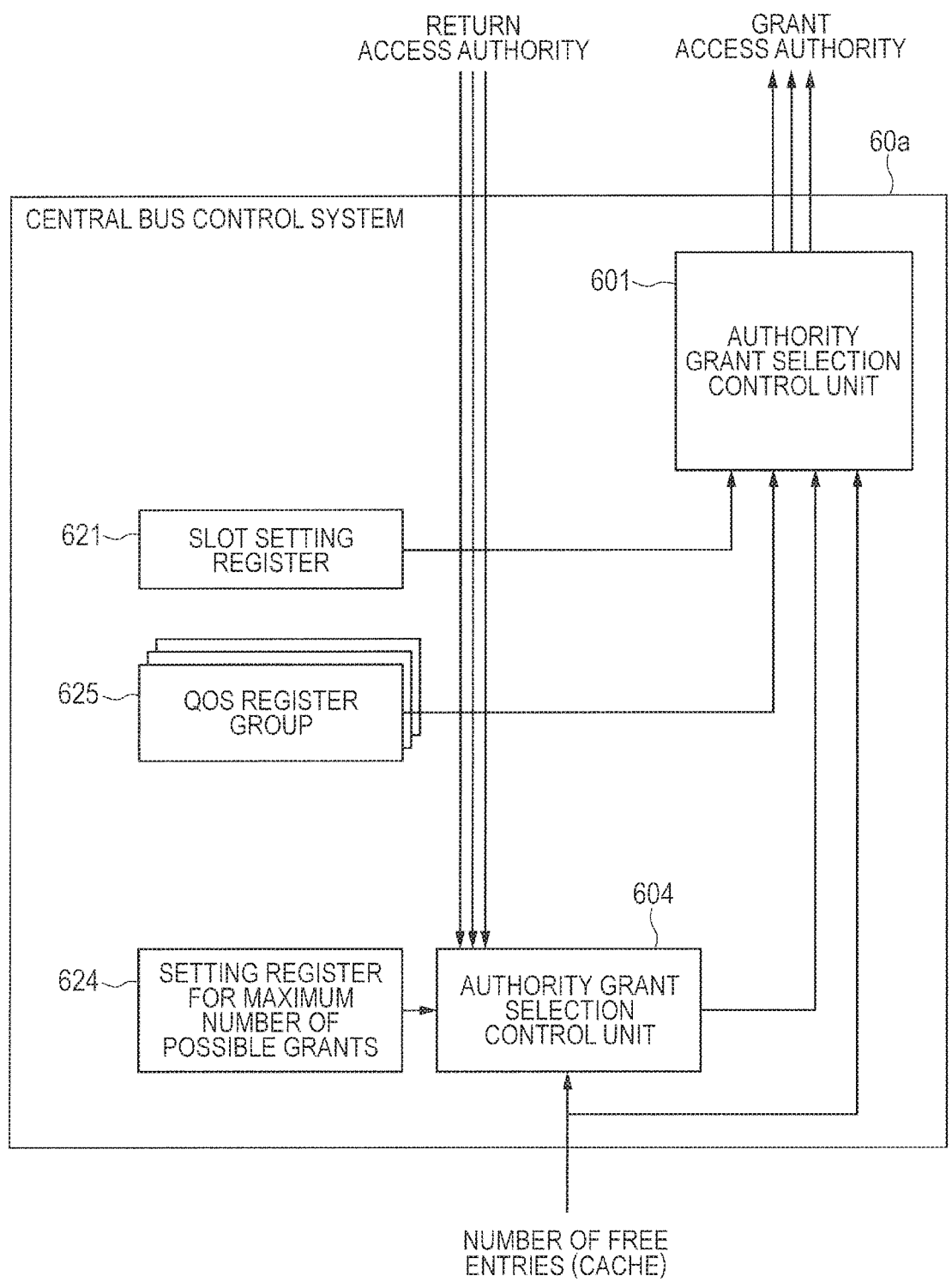
FIG. 9 is a block diagram illustrating a configuration example of the central bus control system 2 applied in a third embodiment.

Descriptions will now be made to a third embodiment. An electronic device according to this embodiment may have the same configuration as that of the electronic device 10 according to the first embodiment illustrated in FIG. 1. FIG. 9 illustrates a configuration of a central bus control system (central bus control system 2) for use in this embodiment. A central bus control system 60a for use in this embodiment has the right grant selection control unit 601, the right number control unit 604, the slot setting register 621, the setting register 624 for the maximum possible number of grants, and a QoS register group 625. The right grant number control unit 604, the slot setting register 621, and the setting register 624 for the maximum possible number of grants may be the same as those described in the first embodiment.

In the first embodiment, the central bus control system. 60 (see FIG. 3) selects a target master to which the access right is granted (a request issue control unit corresponding thereto), using the reservation type register group 622 and the BE type register group 623. On the other hand, in this embodiment, the central bus control system. 60a determines whether to grant the access right for the write request of a particular master, of a plurality of masters, in accordance with the number of free entries in the cache 75.

In the central bus control system 60a according to this embodiment, the QoS register group 625 stores those masters and the conditions of the free entries in the cache 75, in association with each other. The right grant selection control unit 601 acquires the number of free entries of the cache 75, and determines a target master to which an access right is granted, based on the acquired number of free entries and information stored in the QoS register group 625. The right grant selection control unit 601 selects a target master to which the access right is granted, from any of those masters corresponding to the acquired number of free entries that satisfies the conditions stored in the QoS register group 625. As a result of this, for example, some master may be assumed as a target to which the access right is granted, regardless of the number of free entries, while any other master may be assumed as a target to which the access right is granted, for example, only if there are many free entries.

[Setting Example]

FIG. 10 illustrates levels of the numbers of free entries in the cache 75. The numbers of free entries in the cache 75 are managed, based on a plurality of levels. In the example illustrated in FIG. 10, the numbers of free entries in the cache 75 are managed at four levels, from the minimum level "1" to the maximum level "4". The right grant selection control unit 601 determines the level of the acquired number of free entries of the cache 75. When, for example, the number of free entries is equal to or lower than a threshold value "A", the right grant selection control unit 601 determines that the number of free entries is at the level "1". When, for example, the number of free entries is greater than the threshold value "A" and equal to or lower than a threshold value "B", the right grant selection control unit 601 determines that the number of free entries is at the level "2". When, for example, the number of free entries is greater than the threshold value "B" and equal to or lower than a threshold value "C", the right grant selection control unit 601 determines that the number of free entries is at the level "3". When, for example, the number of free entries is equal to or greater than a threshold value "C", the right grant selection control unit 601 determines that the number of free entries is at the level "4". The QoS register group 625 may include a register storing the threshold values for use in determining the levels.

The QoS register group 625 stores the masters and the levels of free entries, in association with each other. The levels of the numbers of free entries stored in the QoS register group 625 represent conditions that corresponding masters are assumed as targets to grant the access right. The right grant selection control unit 601 refers to the QoS register group 625, and selects a target master to which the access right is granted, from any of those masters corresponding to the number of free entries, stored in the QoS register group 625 and equal to or lower than the acquired number of free entries. For example, when the acquired number of free entries is at the level "2", the right grant selection control unit 601 selects a target master to which the access right is granted, from any of those masters stored in association with the level "1" and the level "2", in the QoS register group 625.

FIG. 11 illustrates the relationship between the levels of the numbers of free entries and target masters to which an access right is granted. Now, the four masters from master "A" to master "D" will be examined. The QoS register group 625 stores the conditions for identifying, as targets to which the access right are granted, that the master "A" is at the level "2", the master "B" is at the level "1", the master "C" is at the level "4", and the master "D" is at the level "3". In this case, if the acquired number of free entries is at the level "1", the right grant selection control unit 601 identifies the master "B" only as a target to which the access right is granted. In addition, if the number of free entries is at the level "2", it identifies the masters "A" and "B" as targets to which the access right is granted. If the acquired number of free entries is at the level "3", the right grant selection control unit 601 identifies the masters "A", "B", and "D" are targets to which the access right is granted. If the acquired number of free entries is at the level "4", it identifies the entire masters as targets to which the access right is granted.

[Summary]

In this embodiment, the right grant selection control unit 601 determines target masters to which the access right may be granted, in accordance with the number of entries of the cache 75, and selects a target master to which the access right is granted from the determined target masters. For example, the QoS register group 625 stores a condition for identifying a master inputting a video signal as a target to which the access right is granted always regardless of the free situations of the cache 75, and stores a condition for identifying any other master as a target to which the access right is granted only if the cache 75 has a certain amount of vacancy. In this case, when the cache 75 has only a small number of free entries, the access right to be granted to any master other than the master inputting the video signal is stopped. This facilitates guaranteeing that an overflow does not occur in the buffer of the master inputting the video signal. Instead of selecting the target master to which the access right is granted in accordance with the level of the number of free entries, it is possible to select a target master to which the access right is granted, based on whether the number of free entries is equal to or greater than a threshold value, after setting the threshold value for the number of free entries directly into the QoS register group.

Fourth Embodiment

Figure 12:
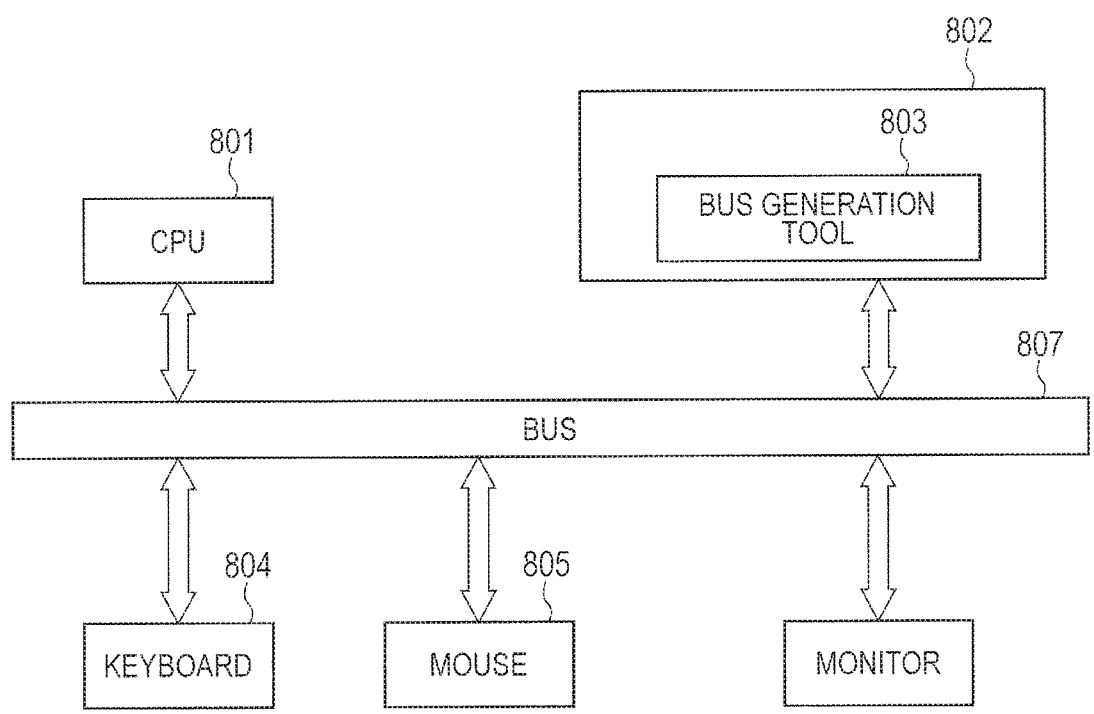
FIG. 12 is a block diagram illustrating a configuration example of the hardware of a bus generator.

Subsequently, descriptions will now be made to a fourth embodiment. In this embodiment, descriptions will be made to a bus generator which generates circuit information of a bus in the semiconductor device from various setting information. FIG. 12 illustrates a hardware configuration example of a bus generator 800. The bus generator 800 is configured as a computer device including a CPU 801, a memory 802, a keyboard 804, a mouse 805, a monitor 806, and a bus 807. The memory 802 stores a bus generation tool 803 for controlling a computer device to operate as the bus generator 800. In the computer device, the CPU 801 executes a process in accordance with the bus generation tool 803 read from the memory 802, thereby controlling the computer device to operate as the bus generator 800.

Figure 13:
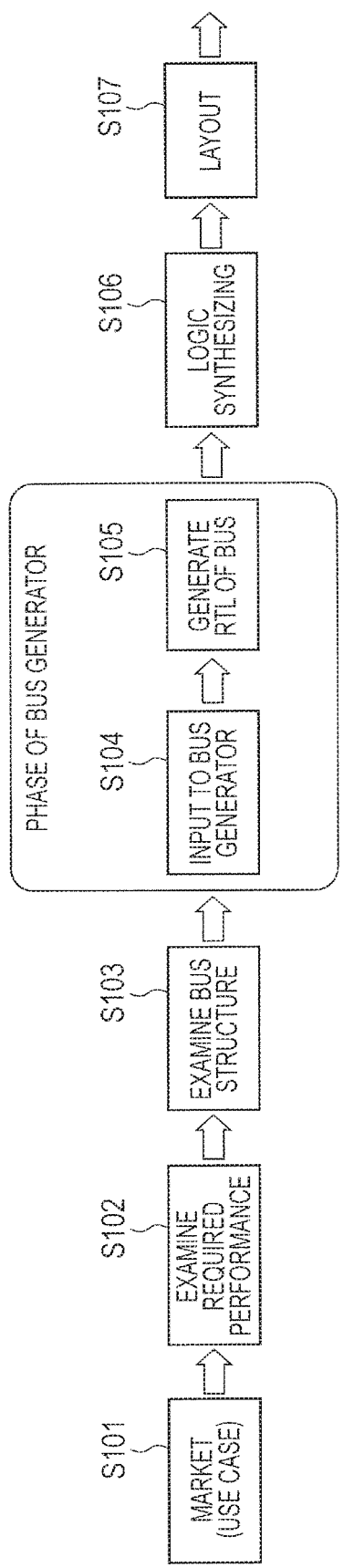
FIG. 13 is a flowchart illustrating a schematic flow of setting a bus.

FIG. 13 illustrates a schematic flow of designing a bus. First, the use case in the market is assumed (Step S101). Then, an examination is made on the required performance required of the bus (Step S102). Next, a bus structure is examined in accordance with the required performance (Step S103). This examination on the bus structure includes an examination as to whether, for example, the central bus control systems 50 and 60 (see FIG. 1) will be used.

Once the bus structure is determined, setting information required for the determined bus structure is input to the bus generator (Step S104). The bus generator generates and outputs circuit information of the bus (Step S105). The circuit information is described, for example, in RTL (Register Transfer Level). After this, the circuit information of the bus is logically synthesized (Step S106), and layout setting is performed (Step S107). Step S104 and Step S105 show phases in which designing is performed using the bus generator.

Figure 14:
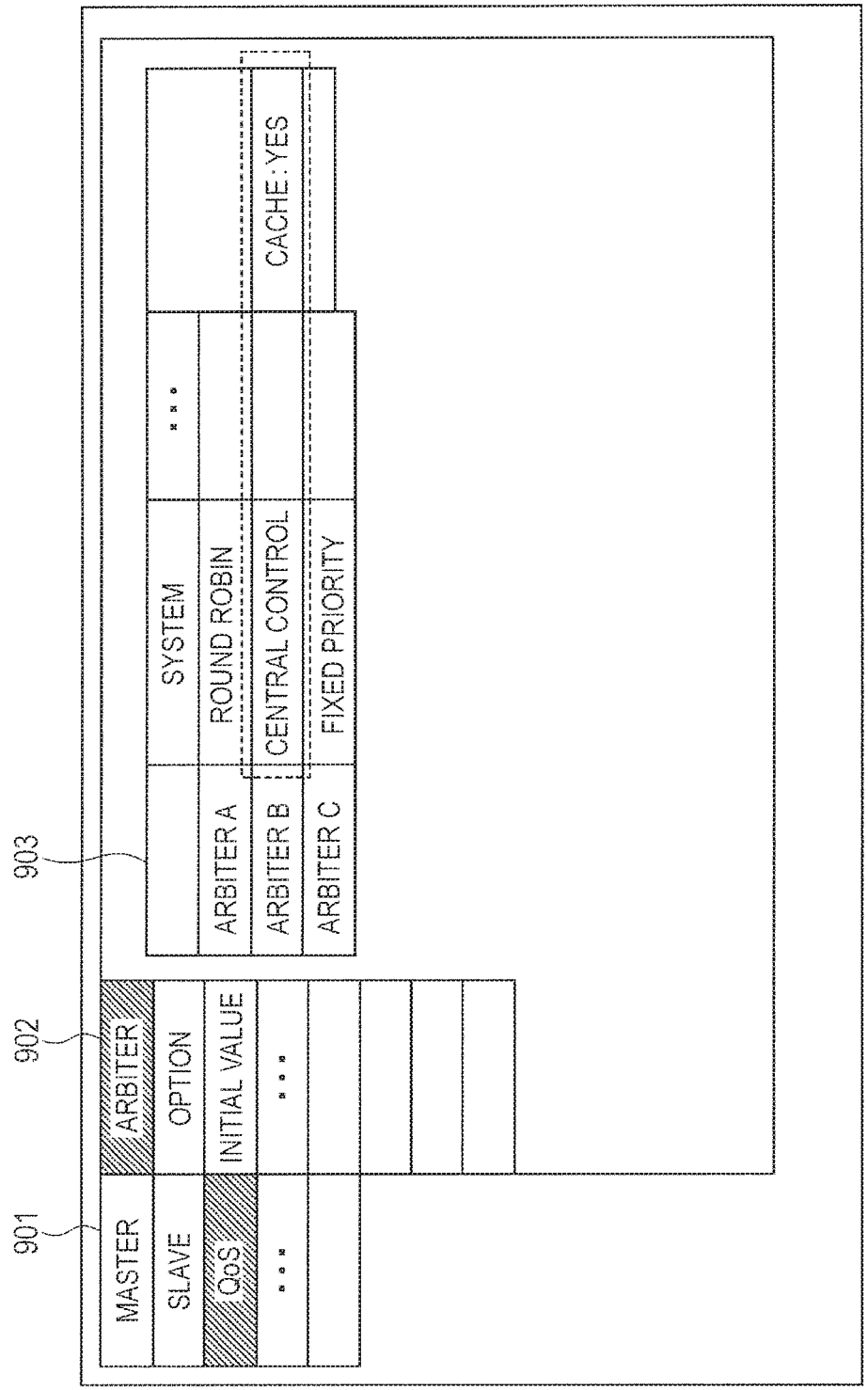
FIG. 14 is a diagram illustrating a screen example of inputting setting information.

FIG. 14 illustrates a screen example of inputting setting information. For example, the monitor 806 (see FIG. 12) displays a screen urging to input setting information. Then, the user gives various setting to the bus generator 800, using the keyboard 804 or the mouse 805. For example, in the screen illustrated in FIG. 14, once the user selects "QoS" from a menu 901, a sub-menu 902 is displayed. Once the user selects "Arbiter" in the sub-menu 902, a selection screen 903 with an arbiter system is displayed. The user selects, for example, a central control system in the selection screen 903, and can select whether to use the cache.

The user inputs, to the bus generator 800, information representing the access target of each master, information regarding a clock to be used, information regarding a bus width, and information regarding the functional safety, for example, as information regarding a master which outputs an access request for a memory. The user also inputs information regarding an address region, information regarding a clock to be used, information regarding a bus width, and information regarding the functional safety, as information regarding the slave to be accessed from the master. Further, the user inputs information specifying the QoS system and specific setting of each system, as information regarding the arbiter.

Figure 15:
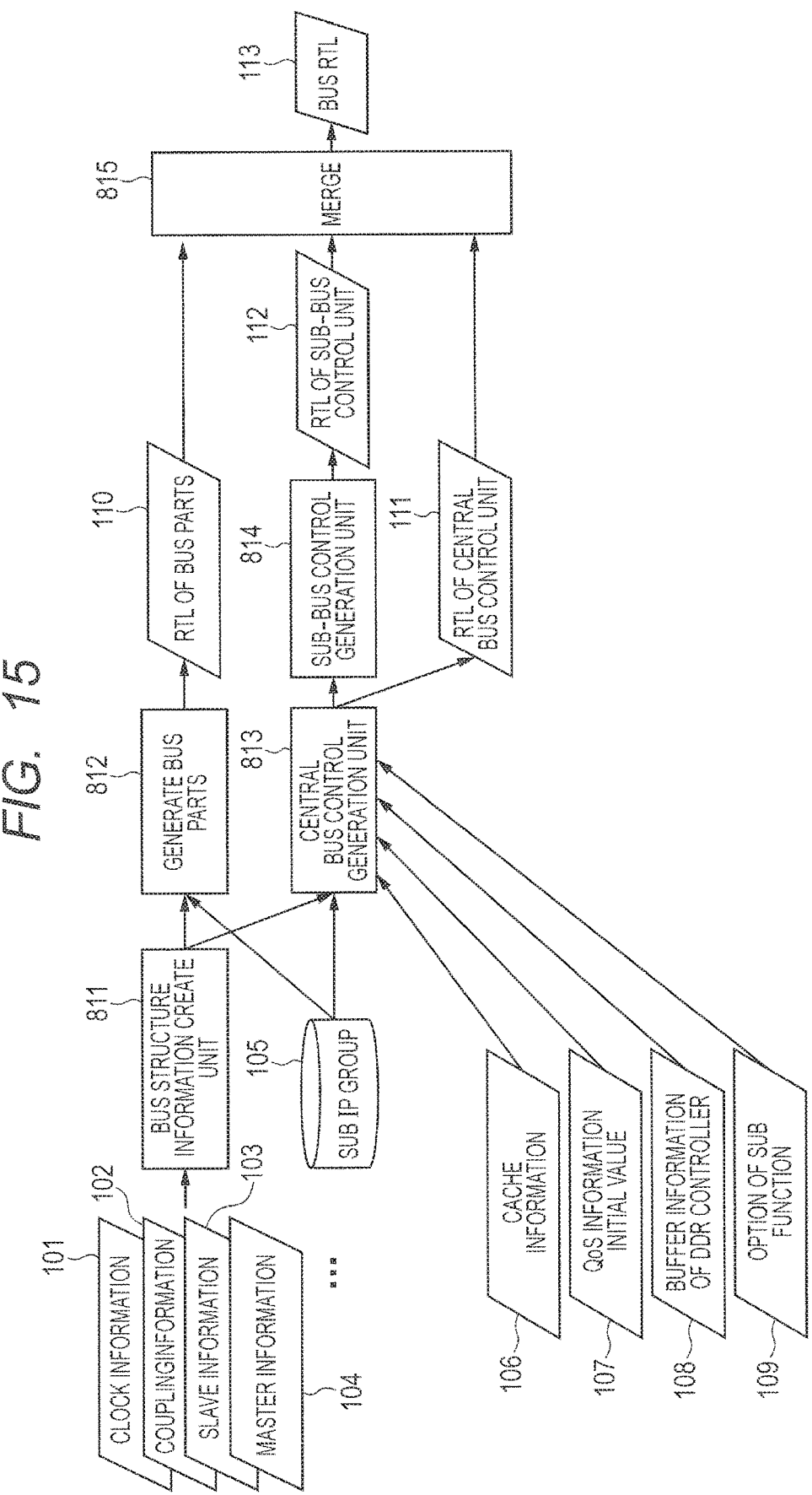
FIG. 15 is a block diagram illustrating a functional example of a bus generator.

FIG. 15 illustrates functional blocks of the bus generator. The bus generator 800 has, as functional blocks, a bus structure information generation unit 811, a bus component generation unit 812, a central bus control unit generation unit 813, a sub-bus control unit generation unit 814, and a merge unit 815. Input to the bus generator 800 are clock information 101, coupling information 102, slave information 103, master information 104, cache information 106, a QoS information initial value 107, DDR controller buffer information 108, and a sub-function option 109. These information items are input through, for example, an input screen for setting information illustrated in FIG. 14.

The bus structure information generation unit 811 generates structure information of a bus for coupling between the master and the slave, using the clock information 101, coupling information 102, slave information 103, and master information 104. The bus component generation unit 812 generates circuit information 110 of various bus components, based on bus structure information generated by the bus structure information generation unit 811 and circuit information of various functional blocks stored in a sub-IP (Intellectual Property) group storage unit 105. The circuit information of various functional blocks stored in the sub-IP group storage unit 105 is provided from a vendor which provides, for example, various IP cores. The bus component generation unit 812 generates the circuit information 110 of bus components described in, for example, RTL.

Input to the central bus control unit generation unit 813 are the bus structure information generated by the bus structure information generation unit 811, the cache information 106, the QoS information initial value 107, the DDR controller buffer information 108, the sub-function option 109, and the circuit information of the various functional blocks stored in the sub-IP group storage group 105. The central bus control unit generation unit 813 generates circuit information 111 of the central bus control system which performs access control for read requests output from a master, write-backs of the cache, and write requests output from the masters. The central bus control unit generation unit 813 generates circuit information 111 of the central bus control system which is described, for example, in RTL. The circuit information 111 of the central bus control system represents a circuit configuration of the central bus control systems 50 and 60 illustrated, for example, in FIG. 1.

The sub-bus control unit generation unit 814 generates circuit information 112 of a sub-bus control system which operates under the control of the central bus control system, using the circuit information 111 of the central bus control system. The sub-bus control unit generation unit 814 generates the circuit information 112 of the sub-bus control system which is described, for example, in RTL. The circuit information 112 of the sub-bus control system represents a circuit configuration of each of the bus-bus controller systems 22R, 32R, 42R, 22W, 32W, 42W, and 77 illustrated in FIG. 1. The merge unit 815 merges the circuit information 110 of the bus component, the circuit information 111 of the central bus control system, and the circuit information 112 of the sub-bus control system. Then, it outputs circuit information 113 of the bus. The circuit information 113 of the bus is written in RTL, in its circuit part regarding the bus between each master and the memory 90, for example, in the electronic device 10 illustrated in FIG. 1.

[Summary]

In this embodiment, the bus generator 800 is used for generating the bus system. If various setting information is input to the bus generator 800, it is possible to automatically generate the bus system between each master and the memory 90 of, for example, the electronic device 10 illustrated in FIG. 1.

Fifth Embodiment

Figure 16:
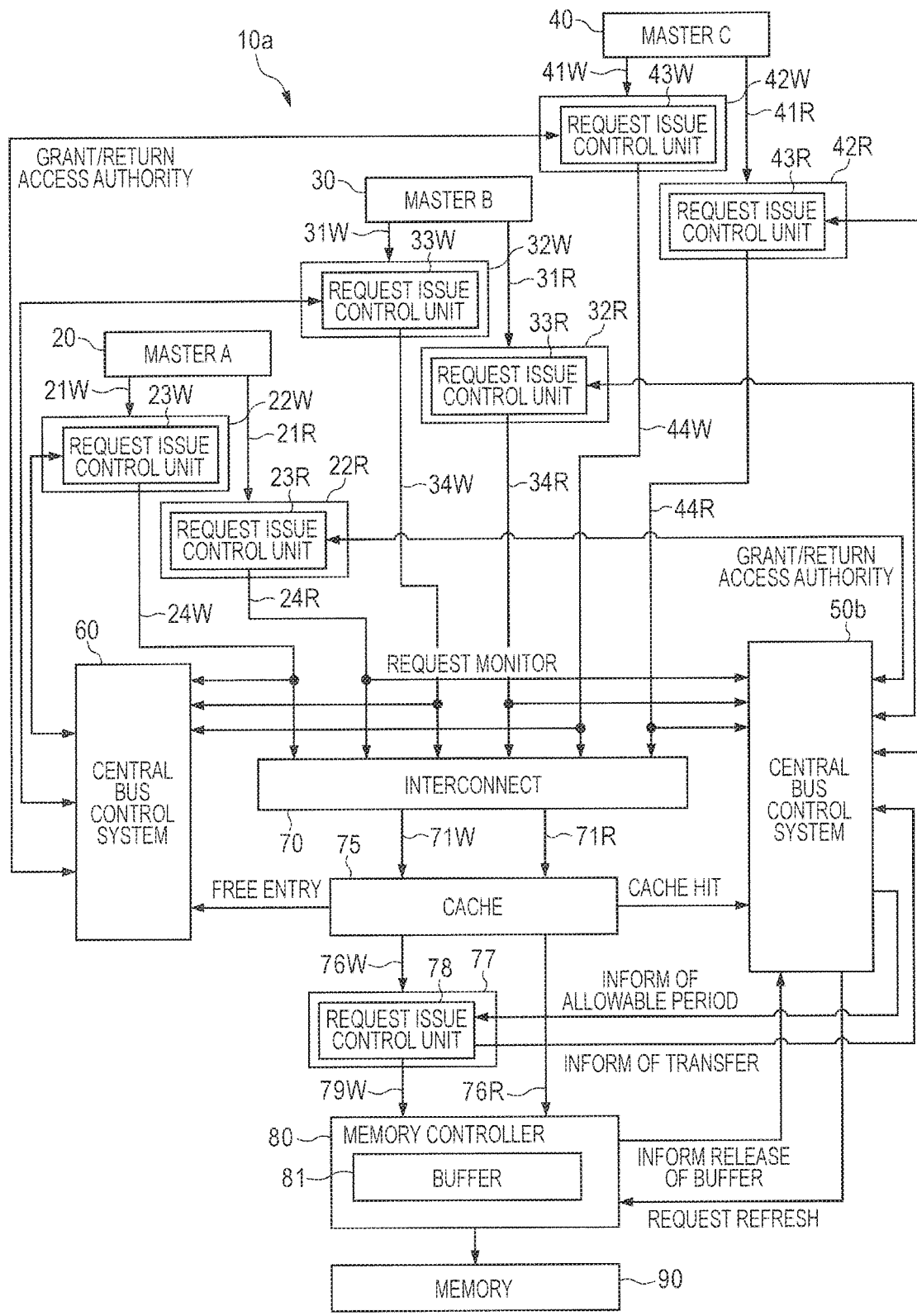
FIG. 16 is a block diagram illustrating an electronic device including a semiconductor device according to a fifth embodiment.

Descriptions will now be made to a fifth embodiment. FIG. 16 illustrates an electronic device including a semiconductor device according to a fifth embodiment. In the electronic device 10 according to the first embodiment illustrated in FIG. 1, the central bus control system 50 controls the access right to be granted to the request issue control unit 78 corresponding to write-back of the cache 75, thereby performing access control for the write back. On the other hand, in an electronic device 10a of this embodiment, a central bus control system 50b controls a signal indicating access permission and output to the request issue control unit 78, thereby performing access control for write-back. Any other points thereof are the same as those of the first to third embodiments.

In this embodiment, the central bus control system. 50b outputs permission period notification to the request issue control unit 78 in the form of a signal indicating access permission. The permission period notification is asserted, when the access is permitted. The notification is negated, when the access is not permitted. When the permission period notification output from the central bus control system 50b is asserted, the write request issue control unit 78 outputs a write request output from the cache 75 to the memory controller 80. The request issue control unit 78 suppresses the output of the write request to the memory controller 80, when the permission period notification is negated. If the request issue control unit 78 outputs the write request to the memory controller 80, it outputs transfer notification representing this output to the central bus control system 50b.

Figure 17:
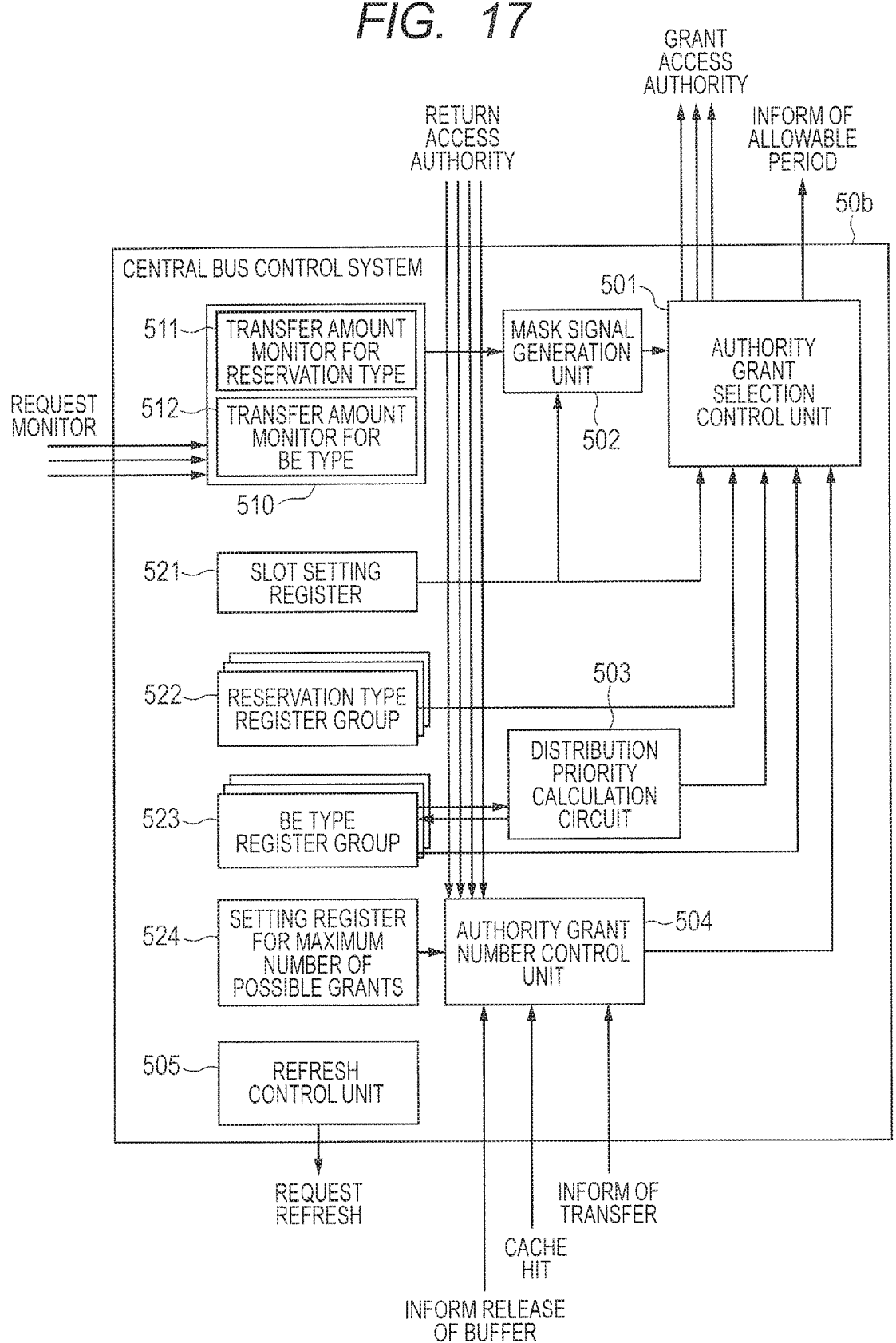
FIG. 17 is a block diagram illustrating a configuration example of the central bus control system 1 applied in the fifth embodiment.

FIG. 17 illustrates a configuration example of the central bus control system 50b. The central bus control system 50b has the right grant selection control unit 501, the mask signal generation unit 502, the distribution priority calculation circuit 503, the right grant number control unit 504, the refresh control unit 505, the transfer amount monitor 510, the slot setting register 521, the reservation type register group 522, the BE (Best Effort) type register group 523, and the setting register 524 for the maximum possible number of grants. In this embodiment, the reservation type register group 522 of the central bus control system 50b does not have to store information representing the reservation bandwidth of the cache 75, and the BE type register group 523 does not have to store information representing a target transfer amount of the cache 75. The transfer amount monitor 510 does not have to monitor a transfer amount of a transaction through the bus 79W between the request issue control unit 78 and the memory controller 80 (see also FIG. 16).

In the central bus control system 50b according to this embodiment, the right grant selection control unit 501 may perform the granting of the access right to the request issue control units 23R, 33R, and 43R, in the same manner as that described in the first embodiment. The right grant selection control unit 501 outputs permission period notification to the request issue control unit 78. The right grant number control unit 504 receives transfer notification from the request issue control unit 78. If the right grant number control unit 504 receives the transfer notification, it regards that an access right has been granted for the write-back of the cache 75, and decreases the possible number of rights to be granted by the number of transferred write requests. The right grant selection control unit 501 grants an access right to the request issue control units 23R, 33R, and 43R, in a range of possible number of rights to be granted.

[Summary]

In the granting of the access right for the write request by the central bus control system 50 according to the first embodiment, the target for which the access right is granted is only the write-back of the cache 75, that is, only the request issue control unit 78. When the access permission of the write-back of the cache is made based on the access right, there is only one target to which the access right is granted. Thus, it can be assumed that the access right is continuously granted in many cases. In general, the access to the DDR memory is bust access. In addition, for the write request, data cells may be transferred. Even if the access right is continuously granted to the request issue control unit 78, it may often be returned to the central bus control system 50 without using it. In this case, the number of any unnecessary access rights to be granted may be increased, and the number of access rights to be granted for the read request may possibly be decreased. In this case, the central bus control system 50b performs access control for the write request using permission period notification to be output to the request issue control unit 78. In this embodiment, when the request issue control unit 78 outputs a write request to the memory controller 80, the possible number of rights to be granted is decreased. This prevents the above-described unnecessary access rights from being granted.

Sixth Embodiment

Descriptions will now be made to a sixth embodiment. An electronic device according to this embodiment may have the same configuration as that of the electronic device 1 according to the first embodiment described in FIG. 1. In this embodiment, like the second embodiment, an access right is exclusively granted indifferent periods to the request issue control units 23R, 33R, and 43R corresponding to the read request of each master and to the request issue control unit 78 corresponding to the write request of the cache 75. In this embodiment, the central bus control system 50a for use in the second embodiment illustrated in FIG. 6 is used as the central bus control system 1. In this embodiment, the refresh control unit 505 of the central bus control system 50a outputs a refresh request to the memory 90 at a switching timing between a period in which the access right is granted for the read request and a period in which the access right is granted for the write request. Any other points are the same as those of the second embodiment.

[Operation Example]

Figure 18A:
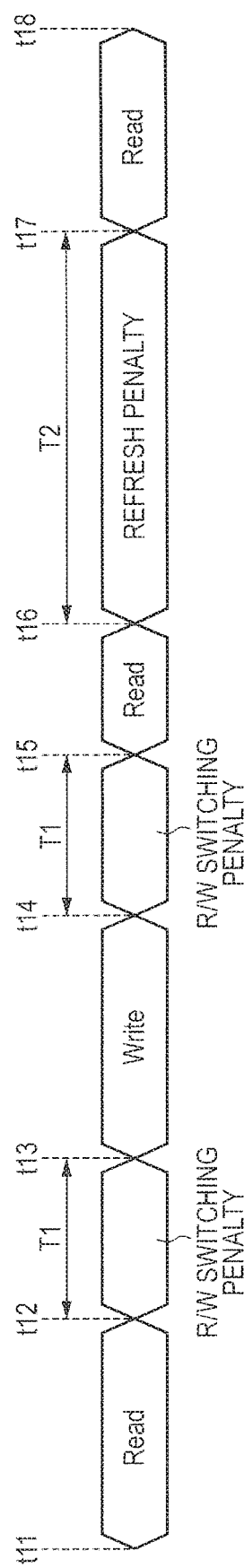
FIG. 18A and FIG. 18B are timings charges each illustrating an operation example of accessing a memory.
Figure 18B:
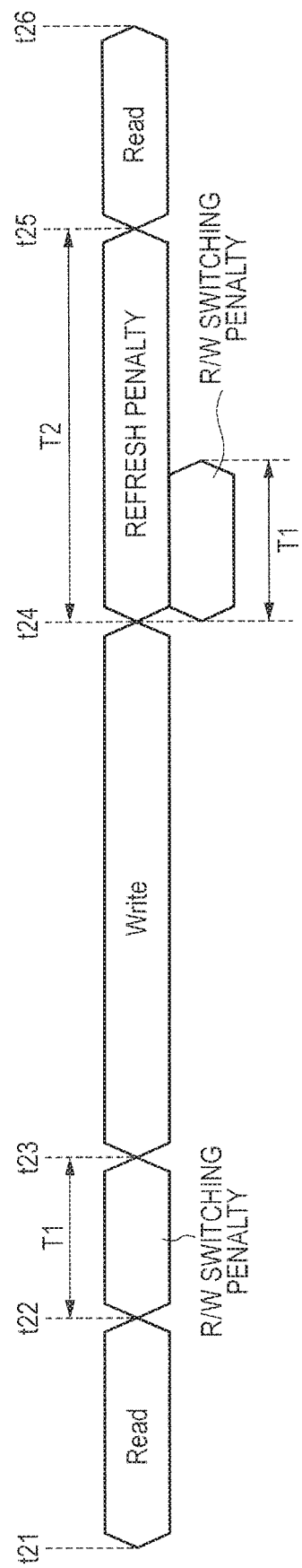

FIG. 18 illustrates an operation example of accessing the memory 90. FIG. 18A illustrates an operation example in which refreshing is performed not at (in conformity with) the switching between the read and the write, while FIG. 18B illustrates an operation example in which refreshing is performed in accordance with the switching between the read and the write.

As illustrated in FIG. 18A, let it be assumed that accessing to the memory 90 starts for performing the read, for example, at a time t11, and then the access type is switched to the write. When the access type for the memory 90 is switched from the read to the write, it is necessary to provide a certain period of time in which memory accessing is not performed only, after completion of the read until the write starts. That is, an R (Read)/W (Write) switching penalty occurs for switching between the read and the write. In FIG. 18A, an R/W switching penalty occurs at a time T1, since completion of the read at a time t12 until the start of the write at a time 13.

After the access type is switched to the write at the time t13, and when the access type is further switched to the read, an R/W switching penalty occurs, for the time T1 since completion of the write at a time t14 until the start of the read at a time t15. When the refresh starts at a time t16, accessing to the memory 90 cannot be performed also during the refresh period, and the refresh penalty occurs at a time T2 since the time t16 until a t17, that is, completion of the refresh. The accessing for reading the memory 90 interrupted by the refreshing restarts at the time t17, and ends at a time t18.

As illustrated in FIG. 18B, accessing for reading the memory 90 starts, for example, at a time t21. It is assumed that the access type is switched to the write thereafter. Even in this case, like the example of FIG. 18A, an R/W switching penalty occurs for a time T1 since a time t22 until a time t23. In the example of FIG. 18B, after the access type is switched to the write at a time t23, the switching of the access type and the refreshing are simultaneously performed at a time t24. In this case, the time T2 (refresh penalty) since the time t24 to a time t25 conceals the R/W switching penalty (T1). It is possible to switch the access type to the read at a time t25, even if it does not additionally wait for the R/W switching penalty. After started at the time t25, the accessing for reading the memory 90 ends at a time t26.

In the example of FIG. 18A, switching of the access type is performed twice since the time t11 until the time t18, and the refresh operation is performed once. In the example of FIG. 18A, the R/W switching penalty occurs twice, and the refresh penalty occurs once. Thus, since the time t11 until the time t18, there are periods for the number "2*T1+T2" of times in which accessing to the memory 90 cannot be performed. In the example of FIG. 18A, since the time t21 until a time t26, switching of the access type is performed twice, and refreshing is performed once. However, in the example of FIG. 18B, because the refresh penalty conceals the R/W switching penalty, the period in which accessing to the memory 90 is not possible is only "T1+T2" since the time t21 until the time t26. When the time since the time t11 until the time t18 is equal to the time since the time t21 until the time t26, the refreshing is performed at the switching timing of the access type. This increases the time in which the accessing to the memory 90 can be performed, by the time T1.

[Summary]

In this embodiment, the central bus control system 50a controls the memory 90 to perform a refresh operation, at a switching timing between a period in which the access right is granted for the read request and a period in which an access right is granted for the write request. In the accessing to the memory, such as the DDR, there is a large penalty of switching the access type between the read and the write. In this embodiment, it is possible to conceal the R/W penalty using the refresh penalty, by performing the refreshing at the switching timing between the period of grating the access right for the read request and the period of granting the access right for the write request. In this manner, it is possible to improve the efficiency of access to the memory 90.

[Modification]

In the above-described embodiment, the descriptions have been made to the example in which the right grant selection control unit 501 (see FIG. 2) of the central bus control system 50 independently selects a target to which the access right is granted using the reservation type register group 522 and selects a target to which the access right is granted using the BE type register group 523. However, it is not limited to this example. The right grant selection control unit 501 may switch between the selection of the target to which the access right is granted using the reservation type register 522 and the selection of the target to which the access right is granted using the BE type register 523. The same applies also into the right grant selection control unit 601 of the central bus control system 60 (see FIG. 3).

In the above-described embodiment, the descriptions have been made to the example of performing the access control for the access request output to the memory controller 80 and the access control for the access request (write request) temporarily stored in the cache 75, using the two central bus control devices. These central bus control devices are not necessarily and physically separated from each other. It is possible to independently perform the access control for the access request to be output to the memory controller 80 and the access control for the access request (write request) stored temporarily in the cache 75, using one central bus control system.

The inventions by the present inventors have specifically been described based on the preferred embodiments. The present invention is not limited to the preferred embodiments. Needless to say, various changes may be made without departing from the scope thereof.

For example, a part or the all of the above-described embodiments may be described in the following additional notes, but are not limited thereto.

[Additional Note 1]

A semiconductor device including
a master which issues access requests including a read request and a write request to a memory;
a memory controller which is coupled to the master through a bus, and accesses the memory in accordance with the access request;
a cache which is arranged between the memory controller and the master, and, when the access request is a write request, caches this write request;
a first access control unit which performs first access control for controlling output for the read request issued by the master to the memory controller and output for the write request cached in the cache to the memory controller; and
a second access control unit which performs second access control for controlling output for the write request issued by the master to the memory controller,
wherein the memory controller has a request buffer which receives and stores the access request,
wherein the first access control unit performs the first access control in accordance with a free situation of the request buffer, and
wherein the second access control unit performs the second access control in accordance with a free situation of the cache.

[Additional Note 2]

The semiconductor device according to additional note 1,
wherein the bus includes a read request bus for transmitting the read request and a write request bus for transmitting the write request,
wherein the first access control unit includes a read sub-bus controller having a read request issue control unit arranged in a manner corresponding to the read request bus, a first write sub-bus controller having a first write request issue control unit arranged in a manner corresponding to the write request bus between the cache and the memory controller, and a first central bus control system performing the first access control using the read sub-bus controller and the first write sub-bus controller, and
wherein the second access control unit includes a second write sub-bus controller having a second write request issue control unit arranged in a manner corresponding to the write request bus between the master and the cache, and a second central bus control system performing the second access control using the second write sub-bus controller.

[Additional Note 3]

The semiconductor device according to additional note 2,
wherein the first central bus control system performs the first access control for the read request, by controlling granting of an access right to the read request issue control unit, and
wherein the read request issue control unit receives the read request from the master, outputs the read request to the memory controller when the access right is granted from the first central bus control system, and suppresses output for the read request to the memory controller when the access right is not granted.

[Additional Note 4]

The semiconductor device according to additional note 3,
wherein the first central bus control system performs the first access control for the write request by controlling granting of an access right to the first write request issue control unit, and
wherein the first write request issue control unit receives the write request from the cache, outputs the write request to the memory controller when the access right is granted from the first central bus control system, and suppresses output for the write request to the memory controller when the access right is not granted.

[Additional Note 5]

The semiconductor device according to additional note 3,
wherein the first central bus control system performs the first access right for the write request by controlling a signal representing access permission and output to the first write request issue control unit, and
wherein the first write request issue control unit receives the write request from the cache, outputs the write request to the memory controller when the signal representing access permission is output from the first central bus control system, and suppresses output of the write request to the memory controller when the signal representing access permission is not output.

[Additional Note 6]

The semiconductor device according to additional note 2,
wherein the second central bus control system performs the second access control by controlling granting of an access right to the second write request issue control unit, and
wherein the second write request issue control unit receives the write request from the master, outputs the write request to the cache when the access right is granted from the second central bus control system, and controls output of the write request to the cache when the access right is not granted.

[Additional Note 7]

The semiconductor device according to claim 2,
wherein the master comprises a first master,
wherein the semiconductor device further comprises:
   a second master; and
   an interconnect which arbitrates an access request input from the first and second masters, and outputs it to the memory controller.

[Additional Note 8]

The semiconductor device according to additional note 7,
wherein the read request issue control unit and the second write request issue control unit are arranged in a manner corresponding to a plurality of read buses and write buses for coupling between each of the first and second masters and the interconnect.

[Additional Note 9]

The semiconductor device according to additional note 4,
wherein the first central bus control system manages a possible number of rights to be granted which represents a possible number of access rights to be granted, in accordance with a number of free entries of the request buffer, and grants the access right to the read request issue control unit and the first write request issue control unit in a range of possible number of rights to be granted.

[Additional Note 10]

The semiconductor device according to additional note 9,
wherein the memory controller outputs, if the request buffer is released, buffer release notification representing that the request buffer has been released to the first central bus control system, and
wherein the first central bus control system subtracts, when the access right is granted to the read request issue control unit and the first write request issue control unit, a number of access rights to be granted from the possible number of rights to be granted, and adds, when the buffer release notification has been received, a number of released entries in the request buffer to the possible number of rights to be granted.

[Additional Note 11]

The semiconductor device according to additional note 10,
wherein the read request issue control unit and the first write request issue control unit return the access right to the first central bus control system, when the access right is granted, and when the read request and the write request are not received, and
wherein the first central bus control system adds a number of returned access rights to the possible number of rights to be granted, when the access right is returned.

[Additional Note 12]

The semiconductor device according to additional note 10,
wherein the cache further caches read data which has been read from the memory, and
wherein, when data requested by a read request output from the read request issue control unit is cached in the cache, the cache outputs cached read data as a response for the read request to the master as an issuer of the read request, and returns an access right granted to the read request issue control unit to the first central bus control system.

[Additional Note 13]

The semiconductor device according to additional note 6,
wherein the second central bus control system manages a possible number of rights to be granted which represents a possible number of access rights to be granted, in accordance with a number of free entries of the cache, and grants the access right to the second write request issue control unit in a range of possible number of rights to be granted.

[Additional Note 14]

The semiconductor device according to additional note 13,
wherein the second central bus control system subtracts a number of access rights to be granted from the possible number of rights to be granted, when the access right is granted to the second write request issue control unit, and adds, when a number of free entries of the cache is increased, the increased number of free entries to the possible number of rights to be granted.

[Additional Note 15]

The semiconductor device according to additional note 14,
wherein the second write request issue control unit returns the access right to the second central bus control system, when the access right is granted, and when the write request is not received, and
wherein the second central bus control system adds a number of returned access right to the possible number of rights to be granted, when the access right is returned.

[Additional Note 16]

The semiconductor device according to additional note 4,
wherein the first central bus control system grants the access right to the read request issue control unit and suppresses granting of the access right to the first write request issue control unit, in a first period, and grants the access right to the first write request issue control unit and suppresses granting of the access right to the read request issue control unit, in a second period.

[Additional Note 17]

The semiconductor device according to additional note 16,
wherein, when a period of a predetermined basic slot is divided into a plurality of periods as sub-slots, the first central bus control system sets the first period and the second period in a unit of sub-slots.

[Additional Note 18]

The semiconductor device according to additional note 17,
wherein the first central bus control system has a register for specifying whether the sub-slot is set in the first period or the second period.

[Additional Note 19]

The semiconductor device according to additional note 17,
wherein the first central control system changes a number of sub-slots set in the first period and a number of sub-slots set in the second period, in accordance with a number of free entries of the cache.

[Additional Note 20]

The semiconductor device according to additional note 17,
wherein, in at least either of switching from the sub-slots set in the first period to the sub-slots set in the second period and switching from the sub-slots sets in the second period to the sub-slots set in the first period, the first central bus control system cancels the suppressed granting of the access right at a timing of a predetermined time before a timing of this switching.

[Additional Note 21]

The semiconductor device according to additional note 16,
wherein the memory is configured to be able to execute a refresh operation, and
wherein the first central bus control system controls the memory to execute the refresh operation at a timing of switching between the first period and the second period.

[Additional Note 22]

The semiconductor device according to additional note 6,
wherein the master comprises a first master,
wherein the semiconductor device further comprises:
a second master; and
an interconnect which arbitrates an access request input from the first and second masters and outputs it to the memory controller,
wherein the second central bus control system determines whether to grant the access right for a write request of a particular master, of the first and second masters, in accordance with a number of free entries of the cache.

[Additional Note 23]

The semiconductor device according to additional note 22,
wherein the second central bus control system has a register which stores the first and second masters and a condition of the number of free entries of cache in association with each other, and determines a master to which the access right is granted, from the first and second masters corresponding to a number of free entries of the cache which satisfies the condition.

[Additional Note 24]

A bus generator which generates a bus in a semiconductor device, including:
a bus structure information generation unit which generates, based on information regarding a master outputting access requests including a read request and a write request to the memory and information regarding a slave accessed from the master, structure information of a bus for coupling between the master and the slave;
a central bus control unit generation unit which generates circuit information of a central bus control system performing access control for a read request output by the master, write-back of the cache, and a write request output by the master, using the structure information of the bus, information regarding a cache temporarily storing the write request and performing the write-back, service quality information of the master, and circuit information of functional blocks;
a sub-bus control unit generation unit which generates circuit information of a sub-bus control system operating under control of the central bus control system, using the circuit information of the central bus control system;
a bus part generation unit which generates circuit information of a bus part, using the structure information of the bus and the circuit information of the functional blocks; and
a merge unit which merges the circuit information of the central bus control system, the circuit information of the sub-bus control system, and the circuit information of the bus part, and generates circuit information of the bus.

What is claimed is:

1. A semiconductor device comprising:
a master which issues an access request including a read request and a write request to a memory;
a memory controller which i) receives the access request from the master through a bus including a read request bus for transmitting the read request and a write request bus for transmitting the write request, ii) stores the received access requests in a request buffer in the memory controller, and ii) accesses the memory in accordance with the received access request;
a cache which is arranged between the memory controller and the master, and, when the access request is a write request, caches this write request;
a first access control unit which includes 1) a read request issue control unit arranged in a manner corresponding to the read request bus, 2) a first write request issue control unit arranged in a manner corresponding to the write request bus between the cache and the memory controller, and 3) a first central bus control system which grants, in accordance with a free situation of the request buffer, an access right to the read request issue control unit and the first write request issue control unit; and
a second access control unit which includes 1) a second write request issue control unit arranged in a manner corresponding to the write request bus between the master and the cache and 2) a second central bus control system which grants, in accordance with a free situation of the cache, an access right to the second write request issue control unit,
wherein the read request issue control unit i) receives the read request from the master and ii) outputs the read request received from the master to the memory controller in response to the access right being granted by the first central bus control system,
wherein the second write request issue control unit i) receives the write request from the master and ii) outputs the write request received from the master to the cache in response to the access right being granted by the second central bus control system, and
wherein the first write request issue control unit i) receives a cached write request from the cache and ii) outputs the cached write request received from the cache to the memory controller in response to the access right being granted by the first central bus control system.

2. The semiconductor device according to claim 1,
wherein the read request issue control unit i) receives the read request from the master, and ii) suppresses output for the read request received from the master to the memory controller when the access right is not granted by the first central bus control system.

3. The semiconductor device according to claim 2,
wherein the first write request issue control unit receives the cached write request from the cache, and suppresses output for the cached write request received from the cache to the memory controller when the access right is not granted by the first central bus control system.

4. The semiconductor device according to claim 3, wherein the first central bus control system i) manages a possible number of access rights to be granted in accordance with a number of free entries of the request buffer and ii) grants the access right to the read request issue control unit and the first write request issue control unit within a range of the possible number of access rights to be granted.

5. The semiconductor device according to claim 4,
wherein the memory controller outputs, when the request buffer is released, a buffer release notification representing that the request buffer is released to the first central bus control system, and
wherein the first central bus control system i) subtracts, when the access right is granted to the read request issue control unit and the first write request issue control unit, a number of access rights to be granted from the possible number of access rights to be granted and ii) adds, when the buffer release notification has been received, a number of released entries in the request buffer to the possible number of access rights to be granted.

6. The semiconductor device according to claim 5,
wherein the cache further caches read data which is read from the memory, and
wherein, when data requested by the read request output from the read request issue control unit is cached in the cache, the cache i) outputs cached read data as a response for the read request to the master being an issuer of the read request, and ii) returns, to the first central bus control system, the access right granted to the read request issue control unit.

7. The semiconductor device according to claim 2,
wherein the first central bus control system outputs a signal representing access permission and output to the first write request issue control unit, and
wherein the first write request issue control unit i) receives the cached write request from the cache, outputs the cached write request received from the cache to the memory controller when the signal representing access permission is output from the first central bus control system and ii) suppresses output of the cached write request received from the cache to the memory controller when the signal representing access permission is not output by the first central bus control system.

8. The semiconductor device according to claim 3,
wherein, in a first period, the first central bus control system i) grants the access right to the read request issue control unit and ii) suppresses granting of the access right to the first write request issue control unit, and
wherein, in a second period, the first central bus control system i) grants the access right to the first write request issue control unit and ii) suppresses granting of the access right to the read request issue control unit.

9. The semiconductor device according to claim 8, wherein, when a period of a predetermined basic slot is divided into a plurality of periods as sub-slots, the first central bus control system sets the first period and the second period in a unit of sub-slots.

10. The semiconductor device according to claim 9, wherein, in at least either of switching from the sub-slots set in the first period to the sub-slots set in the second period and switching from the sub-slots sets in the second period to the sub-slots set in the first period, the first central bus control system cancels the suppressed granting of the access right at a timing of a predetermined time before a timing of this switching.

11. The semiconductor device according to claim 8, wherein the first central bus control system changes a number of sub-slots set in the first period and a number of sub-slots set in the second period, in accordance with a number of free entries of the cache.

12. The semiconductor device according to claim 8,
wherein the memory is configured to be able to execute a refresh operation, and
wherein the first central bus control system controls the memory to execute the refresh operation at a timing of switching between the first period and the second period.

13. The semiconductor device according to claim 1,
wherein the second write request issue control unit i) receives the write request from the master, and ii) controls output of the write request received from the master to the cache when the access right is not granted by the second central bus control system.

14. The semiconductor device according to claim 13, wherein the second central bus control system i) manages a possible number of access rights to be granted in accordance with a number of free entries of the cache and ii) grants the access right to the second write request issue control unit within a range of possible number of access rights to be granted.

15. The semiconductor device according to claim 14, wherein the second central bus control system i) subtracts, when the access right is granted to the second write request issue control unit, a number of access rights to be granted from the possible number of access rights to be granted and ii) adds, when the number of free entries of the cache is increased, the increased number of free entries to the possible number of access rights to be granted.

16. The semiconductor device according to claim 13,
wherein the master comprises a first master,
wherein the semiconductor device further comprises:
a second master; and
an interconnect which arbitrates access requests input from the first and second masters and outputs the arbitrated access requests to the memory controller, and
wherein the second central bus control system determines whether to grant the access right for a write request of a particular master, of the first and second masters, in accordance with a number of free entries of the cache.

17. The semiconductor device according to claim 1,
wherein the master comprises a first master,
wherein the semiconductor device further comprises:
a second master; and
an interconnect which i) arbitrates access requests input from the first and second masters and ii) outputs the arbitrated access request to the memory controller, and
wherein the read request issue control unit and the second write request issue control unit are arranged in a manner corresponding to a plurality of read buses and write buses for coupling between each of the first and second masters and the interconnect.

* * * * *